US012698926B2

(12) United States Patent
Numata et al.

(10) Patent No.: US 12,698,926 B2
(45) Date of Patent: Aug. 4, 2026

(54) HEAT PUMP SYSTEM

(71) Applicants: DENSO CORPORATION, Kariya-city (JP); TOYOTA JIDOSHA KABUSHIKI KAISHA, Toyota (JP)

(72) Inventors: Masanari Numata, Kariya-city (JP); Yu Ofune, Kariya-city (JP); Satoshi Ito, Kariya-city (JP); Naoki Kato, Kariya-city (JP); Nobuharu Kakehashi, Kariya-city (JP); Tatsuhito Matsumoto, Kariya-city (JP); Kaoru Ohtsuka, Mishima (JP); Yasuhiro Oi, Susono (JP); Hidefumi Aikawa, Sunto-gun (JP); Ryo Michikawauchi, Numazu (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 18/745,661

(22) Filed: Jun. 17, 2024

(65) Prior Publication Data

US 2024/0337420 A1      Oct. 10, 2024

Related U.S. Application Data

(63) Continuation of application No. PCT/JP2022/045640, filed on Dec. 12, 2022.

(30) Foreign Application Priority Data

Dec. 20, 2021      (JP) ................................. 2021-205661

(51) Int. Cl.
*F25B 49/02* (2006.01)
*B60H 1/22* (2006.01)
(Continued)

(52) U.S. Cl.
CPC .............. *F25B 30/02* (2013.01); *B60H 1/22* (2013.01); *F25B 25/005* (2013.01); *F25B 49/02* (2013.01);
(Continued)

(58) Field of Classification Search
CPC . B60H 1/22; F25B 5/02; F25B 25/005; F25B 30/02; F25B 49/02; F25B 49/022; F25B 2339/047; F25B 2600/0253
See application file for complete search history.

(56) References Cited

U.S. PATENT DOCUMENTS

2013/0152611 A1*  6/2013  Furll ................... B60H 1/00007
                                                         62/238.7
2014/0158322 A1   6/2014  Homann et al.
(Continued)

FOREIGN PATENT DOCUMENTS

WO      WO-2012028307 A1      3/2012
WO      WO-2013013790 A1      1/2013

*Primary Examiner* — Jonathan Bradford
(74) *Attorney, Agent, or Firm* — Harness, Dickey & Pierce, PLC

(57) ABSTRACT

A heat pump system includes a heat pump cycle, a heating unit, a low-temperature side heat medium circuit, and a control unit. The heat pump cycle includes a compressor, a condenser, and an evaporator. The heating unit heats ventilation air with heat released form refrigerant in the condenser. The low-temperature side heat medium circuit circulates a low-temperature side heat medium such that the refrigerant in the evaporator absorbs heat of the low-temperature side heat medium, and includes a heat source device and a heat amount adjustment unit. The control unit causes an amount of heat transfer in the heating unit for heating the ventilation air to approach a predetermined target value via adjustment in temperature of the low-temperature side heat medium by controlling a rotation speed of the compressor
(Continued)

and an operation of at least one of the heat source device and the heat amount adjustment unit.

8 Claims, 17 Drawing Sheets

(51) Int. Cl.
   F25B 25/00          (2006.01)
   F25B 30/02          (2006.01)
   *F25B 5/02*             (2006.01)
(52) U.S. Cl.
   CPC ............... *F25B 5/02* (2013.01); *F25B 49/022*
        (2013.01); *F25B 2339/047* (2013.01); *F25B*
                                *2600/0253* (2013.01)

(56)                      References Cited

U.S. PATENT DOCUMENTS

2016/0339760  A1 *  11/2016  Dunn  ................... H01M 10/625
2019/0152298  A1 *   5/2019  Kurata  ............... B60H 1/00828
2021/0370748  A1 *  12/2021  Groen  ................. B60H 1/3211

* cited by examiner

FIG. 14

HEAT PUMP SYSTEM

CROSS REFERENCE TO RELATED APPLICATIONS

The present application is a continuation application of International Patent Application No. PCT/JP2022/045640 filed on Dec. 12, 2022, which designated the U.S. and claims the benefit of priority from Japanese Patent Application No. 2021-205661 filed on Dec. 20, 2021.

TECHNICAL FIELD

The present disclosure relates to a heat pump system.

BACKGROUND

Conventionally, as a heat pump system, there has been a technique of using a heat pump cycle including a chiller to pump up heat of a low-temperature heat medium circulating in a low-temperature heat medium circuit.

SUMMARY

A heat pump system according to an aspect of the present disclosure includes a heat pump cycle, a heating unit, a low-temperature side heat medium circuit and a control unit. The heat pump cycle includes a compressor, a condenser, pressure reducing unit and an evaporator. The compressor is configured to compress and discharge a refrigerant. The condenser is configured to release heat of a high-pressure refrigerant compressed by the compressor and condense the high-pressure refrigerant. The pressure reducing unit is configured to reduce a pressure of the refrigerant that has flowed out of the condenser. The evaporator is configured to cause the refrigerant whose pressure is reduced by the pressure reducing unit to absorb heat and evaporate.

The heating unit is configured to heat ventilation air to be blown into a space to be air conditioned by using a heat source that is the heat released from the high-pressure refrigerant in the condenser. The low-temperature side heat medium circuit is configured to circulate a low-temperature side heat medium and cause the refrigerant in the evaporator to absorb heat of the low-temperature side heat medium. The low-temperature side heat medium circuit includes a heat source device and a heat amount adjustment unit. The heat source device is configured to heat the low-temperature side heat medium. The heat amount adjustment unit is configured to adjust an amount of heat carried by the low-temperature side heat medium. The control unit is configured to control an operation of the heat amount adjustment unit.

The control unit is configured to cause an amount of heat transfer in the heating unit for heating the ventilation air to approach a predetermined target value via adjustment in a temperature of the low-temperature side heat medium by controlling a rotation speed of the compressor and an operation of at least one of the heat source device and the heat amount adjustment unit.

BRIEF DESCRIPTION OF DRAWINGS

The above object and other objects, features, and advantages of the present disclosure will become more apparent from the following detailed description with reference to the accompanying drawings.

FIG. 14 is a diagram showing an example of a heating operation by a heat pump system according to a third embodiment.

DETAILED DESCRIPTION

Figure 1:
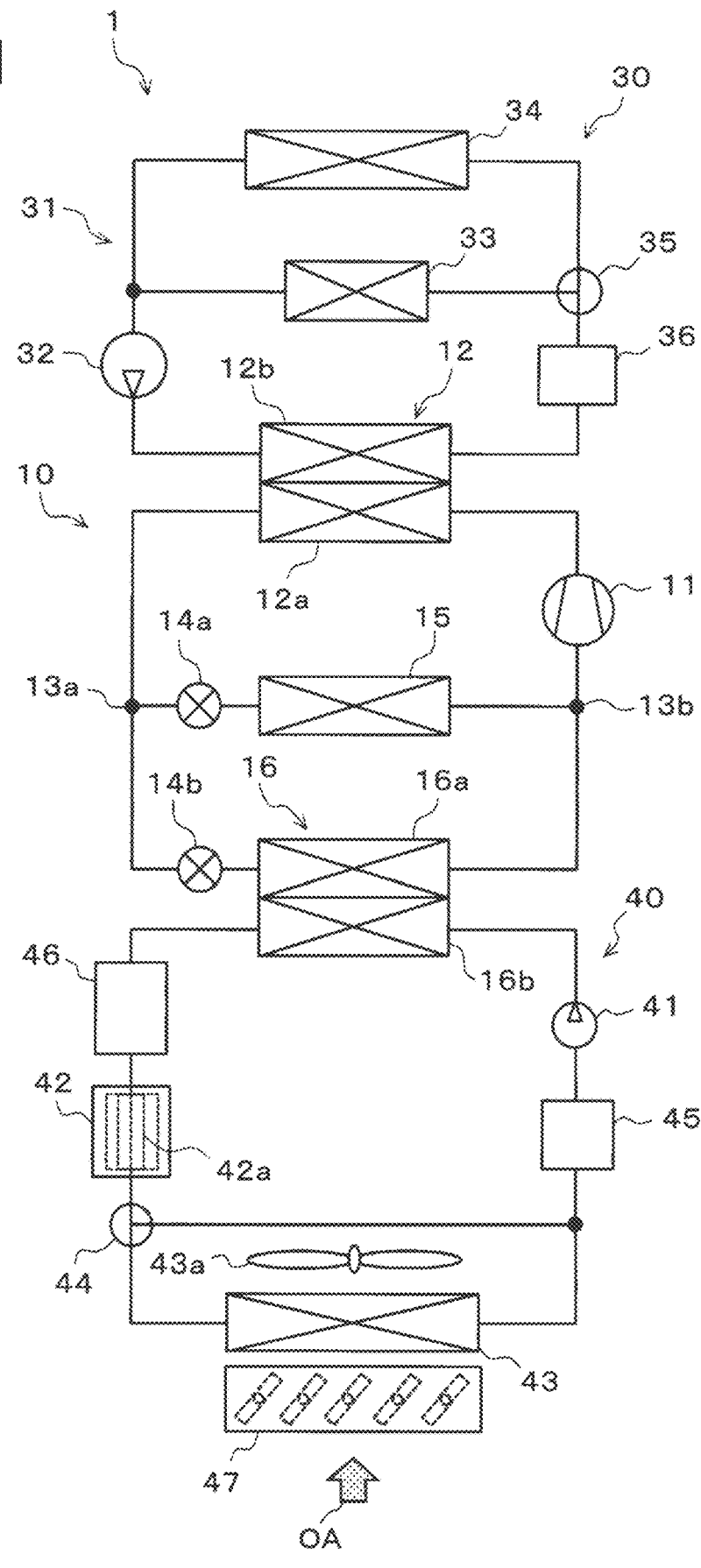
FIG. 1 is an overall configuration diagram of a heat pump system according to a first embodiment.

To begin with, examples of relevant techniques will be described. A heat pump system according to a comparative example includes a heat pump cycle including a chiller to pump up heat of a low-temperature side heat medium circulating in a low-temperature side heat medium circuit, and utilizes the pumped-up heat.

The heat pump system of the comparative example has an electric auxiliary heater and a battery in the low-temperature side heat medium circuit, and pumps up heat generated by the electric auxiliary heater and the like in the heat pump cycle via a low-temperature side heat medium, thereby utilizing the heat to heat an interior of a vehicle cabin.

In the heat pump system of the comparative example, when heating of the interior of the vehicle cabin using the heat of the low-temperature side heat medium is performed, change of a situation surrounding a heating operation may affect heating performance. For example, when a required capacity in heating the interior of the vehicle cabin is changed (for example, a change in a set temperature), a timing at which a required heating capacity is achieved may be delayed compared to a required time because the heating operation is performed via the low-temperature side heat medium. Also when an environment (a traveling speed of the vehicle or the like) during the heating operation is changed, responsiveness to a change in the environment may be insufficient because the heating operation is performed via the low-temperature side heat medium.

In contrast, according to the present disclosure, a heat pump system has a low-temperature side heat medium circuit including a heat source device, and the heat pump system is capable of performing efficient heating while reducing variation in a heating capacity when performing heating with heat of a low-temperature side heat medium.

A heat pump system according to an aspect of the present disclosure includes a heat pump cycle, a heating unit, a low-temperature side heat medium circuit and a control unit. The heat pump cycle includes a compressor, a condenser, pressure reducing unit and an evaporator. The compressor is configured to compress and discharge a refrigerant. The condenser is configured to release heat of a high-pressure refrigerant compressed by the compressor and condense the high-pressure refrigerant. The pressure reducing unit is configured to reduce a pressure of the refrigerant that has flowed out of the condenser. The evaporator is configured to cause the refrigerant whose pressure is reduced by the pressure reducing unit to absorb heat and evaporate.

The heating unit is configured to heat ventilation air to be blown into a space to be air conditioned by using a heat source that is the heat released from the high-pressure refrigerant in the condenser. The low-temperature side heat medium circuit is configured to circulate a low-temperature side heat medium and cause the refrigerant in the evaporator to absorb heat of the low-temperature side heat medium. The low-temperature side heat medium circuit includes a heat source device and a heat amount adjustment unit. The heat source device is configured to heat the low-temperature side heat medium. The heat amount adjustment unit is configured to adjust an amount of heat carried by the low-temperature side heat medium. The control unit is configured to control an operation of the heat amount adjustment unit.

The control unit is configured to cause an amount of heat transfer in the heating unit for heating the ventilation air to approach a predetermined target value via adjustment in a temperature of the low-temperature side heat medium by controlling a rotation speed of the compressor and an operation of at least one of the heat source device and the heat amount adjustment unit.

According to the heat pump system, the heat of the low-temperature side heat medium circulating in the low-temperature side heat medium circuit can be pumped up by the heat pump cycle and used for heating the ventilation air in the heating unit. The heat pump system causes the amount of heat transfer for heating the ventilation air in the heating unit to approach a predetermined target value via adjustment in temperature of the low-temperature side heat medium by controlling the rotation speed of the compressor and an operation of at least one of the heat source device and the heat amount adjustment unit. That is, the heat pump system is capable of ensuring a heating capability of the ventilation air required in the heating unit by adjusting the low-temperature side heat medium temperature using a heat absorbed from the low-temperature side heat medium and a heat released to the low-temperature side heat medium.

According to the heat pump system, a heat capacity of the low-temperature side heat medium in the low-temperature side heat medium circuit can be effectively utilized, and thus it is possible to appropriately cope with a variation in a heating capability required in the heating unit.

Hereinafter, multiple embodiments will be described with reference to the drawings. A part corresponding to an element described in a preceding embodiment is assigned the same numeral and its descriptions may be omitted. When only a part of a component is described in an embodiment, the other part of the component can be relied on the component of a preceding embodiment. In addition to the combination of components explicitly described in each embodiment, it is also possible to combine components from different embodiments, as long as the combination poses no difficulty, even if not explicitly described.

First Embodiment

A first embodiment in the present disclosure will be described with reference to FIGS. 1 to 10. In the first embodiment, a heat pump system 1 according to the present disclosure is applied to a vehicle A. The vehicle A is a battery electric vehicle (BEV) mounted with a battery for traveling and traveling by electric power of the battery.

The heat pump system 1 performs, in an electric vehicle, air conditioning in a vehicle cabin, which is a space to be air conditioned, and temperature adjustment of a battery and a heat generation device 46.

The heat pump system 1 is capable of switching between a cooling mode, a heating mode, and a dehumidifying and heating mode as an air conditioning operation mode in which air conditioning in the vehicle cabin is performed. The cooling mode is an operation mode in which ventilation air blown into the vehicle cabin is cooled and blown into the vehicle cabin. The heating mode is an operation mode in which ventilation air is heated and blown into the vehicle cabin. The dehumidifying and heating mode is an operation mode for performing dehumidifying and heating in the vehicle cabin by reheating the cooled and dehumidified ventilation air and blowing the ventilation air into the vehicle cabin.

In a heat pump cycle 10 of the heat pump system 1, an HFO-based refrigerant (specifically, HFO1234yf) is adopted as a refrigerant, and a subcritical refrigeration cycle is configured in which a high-pressure side refrigerant pressure does not exceed a critical pressure of the refrigerant. The refrigerant contains refrigerator oil for lubricating a compressor 11. As the refrigerator oil, polyalkylene glycol oil (PAG oil) having compatibility with a liquid-phase refrigerant is adopted. Some of the refrigerator oil circulates in a cycle together with the refrigerant.

Next, a specific configuration of the heat pump system 1 according to the first embodiment will be described with reference to FIGS. 1 and 2. The heat pump system 1 according to the first embodiment includes a heat pump cycle 10, a heating unit 30, a low-temperature side heat medium circuit 40, an interior air conditioning unit 60, and an energy manager 70.

First, component devices constituting the heat pump cycle 10 in the heat pump system 1 will be described. The heat pump cycle 10 is a vapor compression type refrigeration cycle. First, the compressor 11 sucks, compresses, and discharges the refrigerant in the heat pump cycle 10. The compressor 11 is disposed in a vehicle engine hood.

The compressor 11 is an electric compressor that rotationally drives a fixed capacity type compression mechanism that has a fixed discharge capacity by an electric motor. A rotation speed (i.e., refrigerant discharge capacity) of the compressor 11 is controlled by a control signal output from the energy manager 70 to be described later. In the compressor 11, a rotation speed upper limit value Ncul is determined, and the rotation speed upper limit value Ncul is determined to be higher as a traveling speed of the vehicle A is higher. This point will be described later.

An inlet side of a refrigerant passage 12a in a heat medium-refrigerant heat exchanger 12 is connected to a discharge port of the compressor 11. The heat medium-refrigerant heat exchanger 12 is a heat exchanger that releases heat of a high-pressure refrigerant discharged from the compressor 11 to a high-temperature side heat medium circulating in a high-temperature side heat medium circuit 31 of the heating unit 30, and heats a high-temperature side heat medium.

The heat medium-refrigerant heat exchanger 12 includes the refrigerant passage 12a through which the refrigerant in the heat pump cycle 10 flows, and a heat medium passage 12b through which the high-temperature side heat medium in the high-temperature side heat medium circuit 31 flows. The heat medium-refrigerant heat exchanger 12 is formed of the same kind of metal (aluminum alloy in the first embodiment) having excellent heat conductivity, and components are integrated by brazing.

Accordingly, the high-pressure refrigerant flowing through the refrigerant passage 12a and the high-temperature side heat medium flowing through the heat medium passage 12b is capable of exchanging heat with each other. The heat medium-refrigerant heat exchanger 12 is an example of a condenser that releases heat of the high-pressure refrigerant, and constitutes a part of the heating unit 30 to be described later.

A first connection portion 13a having a three-way joint structure is connected to an outlet of the refrigerant passage 12a of the heat medium-refrigerant heat exchanger 12. In the first connection portion 13a, one of three inflow and outflow ports is a refrigerant inflow port, and the remaining two are refrigerant outflow ports. That is, the first connection portion 13a is a branch portion that branches flow of the liquid-phase refrigerant flowing out of the heat-medium-refrigerant heat exchanger 12.

One refrigerant outflow port of the first connection portion 13a is connected to a refrigerant inlet side of an air-conditioning evaporator 15 via a first expansion valve 14a. The other refrigerant outflow port of the refrigerant branch portion is connected to a refrigerant inlet side of a chiller 16 via a second expansion valve 14b.

The first expansion valve 14a reduces a pressure of the refrigerant that has flowed out of one of the refrigerant outflow ports of the first connection portion 13a in at least an operation mode in which the ventilation air is cooled. The first expansion valve 14a is an electric variable throttle mechanism, and includes a valve body and an electric actuator. The first expansion valve 14a includes a so-called electric expansion valve.

The valve body of the first expansion valve 14a is configured to change a passage opening degree (in other words, a throttle opening degree) of the refrigerant passage. The electric actuator includes a stepping motor that changes a throttle opening degree of the valve body. An operation of the first expansion valve 14a is controlled by a control signal output from the energy manager 70.

The first expansion valve 14a includes a variable throttle mechanism having a fully opening function of fully opening the refrigerant passage when the throttle opening degree is fully opened and a fully closing function of closing the refrigerant passage when the throttle opening degree is fully closed. That is, the first expansion valve 14a can be prevented from exhibiting a pressure reducing action on the refrigerant by fully opening the refrigerant passage.

The first expansion valve 14a is capable of blocking inflow of the refrigerant into the air-conditioning evaporator 15 by closing the refrigerant passage. That is, the first expansion valve 14a has both a function as a pressure reducing unit that reduces the pressure of the refrigerant and a function as a refrigerant circuit switching unit that switches a refrigerant circuit. The first expansion valve 14a is capable of adjusting a flow rate of the refrigerant flowing into the air-conditioning evaporator 15 by adjusting a throttle opening degree with respect to the refrigerant passage.

An outlet of the first expansion valve 14a is connected to the refrigerant inlet side of the air-conditioning evaporator 15. As shown in FIG. 2, the air-conditioning evaporator 15 is disposed in a casing 61 of the interior air conditioning unit 60. The air-conditioning evaporator 15 exchanges heat between the low-pressure refrigerant whose pressure is reduced by the first expansion valve 14a and the ventilation air, evaporates the low-pressure refrigerant, and cools the ventilation air, at least in an operation mode in which the ventilation air is cooled.

As shown in FIG. 1, the second expansion valve 14b is connected to the other refrigerant outflow port of the first connection portion 13a. The second expansion valve 14b reduces the pressure of the refrigerant that has flowed out of the other refrigerant outflow port of the first connection portion 13a in at least the heating mode.

Like the first expansion valve 14a, the second expansion valve 14b is an electric variable throttle mechanism and includes a valve body and an electric actuator. That is, the second expansion valve 14b includes a so-called electric expansion valve, and has a fully opening function and a fully closing function.

That is, the second expansion valve 14b can be prevented from exhibiting a pressure reducing action on the refrigerant by fully opening the refrigerant passage. The second expansion valve 14b is capable of blocking inflow of the refrigerant into the chiller 16 by closing the refrigerant passage. That is, the second expansion valve 14b has both a function as a pressure reducing unit that reduces the pressure of the refrigerant and a function as a refrigerant circuit switching unit that switches a refrigerant circuit. The second expansion valve 14b is an example of the pressure reducing unit.

An outlet of the second expansion valve 14b is connected to the refrigerant inlet side of the chiller 16. The chiller 16 is a heat exchanger that exchanges heat between the low-pressure refrigerant whose pressure is reduced by the second expansion valve 14b and the low-temperature side heat medium circulating in the low-temperature side heat medium circuit 40.

The chiller 16 has a refrigerant passage 16a through which the low-pressure refrigerant whose pressure is reduced by the second expansion valve 14b flows, and a heat medium passage 16b through which the low-temperature side heat medium circulating in the low-temperature side heat medium circuit 40 flows. Accordingly, the chiller 16 is an evaporator that evaporates the low-pressure refrigerant and absorbs heat from the low-temperature side heat medium by heat exchange between the low-pressure refrigerant flowing through the refrigerant passage 16a and the low-temperature side heat medium flowing through the heat medium passage 16b. That is, the chiller 16 corresponds to an example of the evaporator.

As shown in FIG. 1, one refrigerant inlet side of a second connection portion 13b is connected to a refrigerant outlet of the air-conditioning evaporator 15. The other refrigerant inlet side of the second connection portion 13b is connected to a refrigerant outlet side of the chiller 16. The second connection portion 13b has a three-way joint structure similar to that of the first connection portion 13a, and two of three inflow and outflow ports are refrigerant inlets and the remaining one is a refrigerant outlet.

Accordingly, the second connection portion 13b is a merging portion that merges flow of the refrigerant that has flowed out of the air-conditioning evaporator 15 and flow of the refrigerant that has flowed out of the chiller 16. A refrigerant outlet of the second connection portion 13b is connected to a suction port side of the compressor 11.

Next, the heating unit 30 in the heat pump system 1 will be described. The heating unit 30 is configured to heat the ventilation air to be supplied to the space to be air conditioned using the high-pressure refrigerant in the heat pump cycle 10 as a heat source.

The heating unit 30 according to the first embodiment includes the high-temperature side heat medium circuit 31. The high-temperature side heat medium circuit 31 is a heat medium circuit that circulates the high-temperature side heat medium, and a solution containing ethylene glycol, anti-freeze, or the like can be adopted as the high-temperature side heat medium.

As shown in FIG. 1, in the high-temperature side heat medium circuit 31, the heat medium passage 12b of the heat medium-refrigerant heat exchanger 12, a high-temperature side pump 32, a heater core 33, a high-temperature side outside air heat exchanger 34, a high-temperature side flow rate adjustment valve 35, a high-temperature side heater 36, and the like are disposed.

As described above, in the heat medium passage 12b of the heat medium-refrigerant heat exchanger 12, the high-temperature side heat medium is heated by heat exchange with the high-pressure refrigerant flowing through the refrigerant passage 12a. That is, the high-temperature side heat medium is heated using heat pumped up by the heat pump cycle 10.

A discharge port of a high-temperature side pump 32 is connected to an inlet side of the heat medium passage 12b of the heat medium-refrigerant heat exchanger 12. The high-temperature side pump 32 is a heat medium pump that pumps the high-temperature side heat medium in order to circulate the high-temperature side heat medium in the high-temperature side heat medium circuit 31. The high-temperature side pump 32 is an electric pump whose rotation speed (that is, pumping capacity) is controlled by a control voltage output from the energy manager 70.

The high-temperature side heater 36 is connected to an outlet side of the heat medium passage 12b of the heat medium-refrigerant heat exchanger 12. The high-tempera-ture side heater 36 generates heat by being supplied with electric power, and heats the high-temperature side heat medium flowing through a heat medium passage of the high-temperature side heater 36. As the high-temperature side heater 36, for example, a PTC heater having a PTC element (that is, a positive characteristic thermistor) can be used. The high-temperature side heater 36 is capable of freely adjusting a heat amount for heating the high-tempera-ture side heat medium according to a control voltage output from the energy manager 70.

An inflow port of the high-temperature side flow rate adjustment valve 35 is connected to an outlet side of the heat medium passage of the high-temperature side heater 36. The high-temperature side flow rate adjustment valve 35 includes an electric three-way flow rate adjustment valve having three inflow and outflow ports.

An inflow port of the heater core 33 is connected to one outflow port of the high-temperature side flow rate adjust-ment valve 35. The heater core 33 is a heat exchanger that heats the ventilation air by exchanging heat between the high-temperature side heat medium heated by the heat medium-refrigerant heat exchanger 12 and the like and the ventilation air that has passed through the air-conditioning evaporator 15. As shown in FIG. 2, the heater core 33 is disposed in the casing 61 of the interior air conditioning unit 60. Accordingly, the heater core 33 corresponds to an example of a heating heat exchanger.

An inflow port of the high-temperature side outside air heat exchanger 34 is connected to the other outflow port of the high-temperature side flow rate adjustment valve 35. The high-temperature side outside air heat exchanger 34 exchanges heat between the high-temperature side heat medium heated by the heat medium-refrigerant heat exchanger 12 and the like and outside air OA, and releases the heat of the high-temperature side heat medium to the outside air OA.

The high-temperature side outside air heat exchanger 34 is disposed on a front side in the vehicle engine hood. As the vehicle A travels, the outside air OA flows from a vehicle front side to a rear side, and passes through a heat exchang-ing unit of the high-temperature side outside air heat exchanger 34. Accordingly, the high-temperature side out-side air heat exchanger 34 is capable of releasing heat to the outside air OA using traveling wind.

A high-temperature side merging portion of a three-way joint structure is connected to an outflow port of the high-temperature side outside air heat exchanger 34 and an outflow port of the heater core 33. In the high-temperature side merging portion, one of the three inflow and outflow ports in the three-way joint structure is an outflow port, and the remaining two are inflow ports. Accordingly, the high-temperature side merging portion is capable of merging flow of the high-temperature side heat medium that has passed through the high-temperature side outside air heat exchanger 34 and flow of the high-temperature side heat medium that has passed through the heater core 33. A suction port of the high-temperature side pump 32 is connected to the outflow port in the high-temperature side merging portion.

Thus, in the high-temperature side heat medium circuit 31 in the first embodiment, the high-temperature side outside air heat exchanger 34 and the heater core 33 are connected in parallel with respect to flow of the high-temperature side heat medium passing through the heat medium passage 12b of the heat medium-refrigerant heat exchanger 12. In the high-temperature side heat medium circuit 31, the high-temperature side flow rate adjustment valve 35 is capable of continuously adjusting a flow rate ratio of a flow rate of the high-temperature side heat medium flowing into the heater core 33 to a flow rate of the high-temperature side heat medium flowing into the high-temperature side outside air heat exchanger 34.

That is, by controlling an operation of the high-tempera-ture side flow rate adjustment valve 35, it is possible to adjust a heat amount of the high-temperature side heat medium that is released to the outside air OA by the high-temperature side outside air heat exchanger 34 and a heat amount of the high-temperature side heat medium that is released to ventilation air by the heater core 33.

Next, the low-temperature side heat medium circuit 40 in the heat pump system 1 will be described. The low-temperature side heat medium circuit 40 is a heat medium circuit that circulates the low-temperature side heat medium. As the low-temperature side heat medium, a similar fluid as the high-temperature side heat medium in the high-temperature side heat medium circuit 31 can be adopted.

In the low-temperature side heat medium circuit 40, the heat medium passage 16*b* of the chiller 16, a low-temperature side pump 41, a battery heat exchanging unit 42, a low-temperature side outside air heat exchanger 43, a low-temperature side flow rate adjustment valve 44, a low-temperature side heater 45, the heat generation device 46, a shutter device 47, and the like are disposed. A discharge port side of the low-temperature side pump 41 is connected to an inflow port of the heat medium passage 16*b* in the chiller 16.

The low-temperature side pump 41 is a heat medium pump that pumps the low-temperature side heat medium to the heat medium passage 16*b* of the chiller 16 in the low-temperature side heat medium circuit 40. A basic configuration of the low-temperature side pump 41 is similar as that of the high-temperature side pump 32. Since a flow rate of the low-temperature side heat medium passing through the chiller 16 and the like can be adjusted, the low-temperature side pump 41 corresponds to an example of a heat amount adjustment unit.

An inlet side of a heat medium passage in the heat generation device 46 is connected to an outflow port in the heat medium passage 16*b* of the chiller 16. The heat generation device 46 includes a device that generates heat in association with an operation for a purpose of traveling or the like among in-vehicle devices mounted on the vehicle A. The heat generation device 46 corresponds to an example of a heat source device.

The heat generation device 46 includes an inverter INV and a motor generator MG. The heat medium passage of the heat generation device 46 is provided so that component devices can be cooled by circulating a heat medium.

The inverter INV is a power conversion unit that converts a direct current into an alternating current. The motor generator MG outputs a driving force for traveling by being supplied with electric power, and generates regenerative electric power during deceleration or the like.

A transaxle device may be adopted as the heat generation device 46. The transaxle device is a device in which a transmission and a final gear and differential gear (differential gear) are integrated.

An inlet side of a heat medium passage 42*a* of the battery heat exchanging unit 42 is connected to an outlet side of the heat medium passage of the heat generation device 46. The battery heat exchanging unit 42 is connected to the low-temperature side heat medium circuit 40 so as to be coolable by the low-temperature side heat medium, and is configured to maintain a temperature of a battery within a predetermined temperature range. Specifically, the low-temperature side heat medium is passed through the heat medium passage 42*a* of the battery heat exchanging unit 42 to exchange heat, so that heat generated in the battery is absorbed by the low-temperature side heat medium and the temperature of the battery is adjusted. The battery heat exchanging unit 42 and the battery correspond to an example of the heat source device.

The battery supplies power to various electrical devices of the vehicle A, and for example, a rechargeable and dischargeable secondary battery (in the present embodiment, a lithium ion battery) is adopted. The battery generates heat during charging and discharging. The battery is a so-called assembled battery provided by stacking multiple battery cells and electrically connecting the battery cells in series or in parallel. In this type of battery, an output tends to decrease at a low temperature, and deterioration tends to progress at a high temperature.

Therefore, it is necessary for the temperature of the battery to be maintained within an appropriate temperature range (for example, 10° C. or more and 40° C. or less) in which a charging and discharging capacity of the battery can be sufficiently utilized. Therefore, in the heat pump system 1, the temperature of the battery is appropriately adjusted by controlling a flow rate or the like of the low-temperature side heat medium flowing through the battery heat exchanging unit 42.

The low-temperature side flow rate adjustment valve 44 is connected to the outlet side of the heat medium passage 42*a* of the battery heat exchanging unit 42. The low-temperature side flow rate adjustment valve 44 includes an electric three-way flow rate adjustment valve having three inflow and outflow ports. As shown in FIG. 1, an inflow port of the low-temperature side flow rate adjustment valve 44 is connected to the outlet side of the heat medium passage 42*a* of the battery heat exchanging unit 42.

An inflow port side of the low-temperature side outside air heat exchanger 43 is connected to one outflow port of the low-temperature side flow rate adjustment valve 44. The low-temperature side outside air heat exchanger 43 is a heat exchanger that exchanges heat between the low-temperature side heat medium circulating in the low-temperature side heat medium circuit 40 and the outside air OA blown by an outside air fan 43*a*. The low-temperature side outside air heat exchanger 43 is disposed on a front side in a drive device chamber. Therefore, when the vehicle is traveling, traveling wind can be applied to the low-temperature side outside air heat exchanger 43.

The low-temperature side heater 45 is connected to an outflow port of the low-temperature side outside air heat exchanger 43. The low-temperature side heater 45 generates heat by being supplied with electric power, and heats the low-temperature side heat medium flowing through the heat medium passage of the low-temperature side heater 45. The low-temperature side heater 45 corresponds to an example of the heat source device.

As the low-temperature side heater 45, a PTC heater can be used similarly to the high-temperature side heater 36. The low-temperature side heater 45 is capable of freely adjusting a heat amount for heating the high-temperature side heat medium according to a control voltage output from the energy manager 70. A suction port side of the low-temperature side pump 41 is connected to an outflow port of the heat medium passage of the low-temperature side heater.

One end side of a bypass flow path for circulating the low-temperature side heat medium so as to bypass the low-temperature side outside air heat exchanger 43 is connected to the other outflow port of the low-temperature side flow rate adjustment valve 44. A merging portion of a three-way joint structure is connected to the other end side of the bypass flow path. In the merging portion, two of three inflow and outflow ports in the three-way joint structure are inflow ports, and the remaining one is an outflow port.

The merging portion is disposed in a heat medium flow path that connects the outflow port of the low-temperature side outside air heat exchanger 43 and an inflow port of the low-temperature side heater 45. Accordingly, the merging portion merges flow of the low-temperature side heat medium that has flowed through the low-temperature side outside air heat exchanger 43 and flow of the low-temperature side heat medium that has flowed through the bypass flow path, and causes the flow to flow out to the suction port side of the low-temperature side pump 41.

Therefore, the low-temperature side flow rate adjustment valve 44 is capable of continuously adjusting a flow rate ratio between a flow rate of the low-temperature side heat medium passing through the low-temperature side outside air heat exchanger 43 and a flow rate of the low-temperature side heat medium bypassing the low-temperature side outside air heat exchanger 43 in relation to flow of the low-temperature side heat medium that has passed through the heat medium passage 16b of the chiller 16. That is, the low-temperature side heat medium circuit 40 is capable of switching the flow of the low-temperature side heat medium by controlling an operation of the low-temperature side flow rate adjustment valve 44. The low-temperature side flow rate adjustment valve 44 corresponds to an example of the heat amount adjustment unit.

As shown in FIG. 1, in the low-temperature side heat medium circuit 40, the outside air fan 43a and the shutter device 47 are disposed as devices for the low-temperature side outside air heat exchanger 43. The outside air fan 43a blows the outside air OA to the low-temperature side outside air heat exchanger 43. The outside air fan 43a is an electric blower whose rotation speed (that is, air blowing capacity) is controlled by a control voltage output from the energy manager 70. That is, the outside air fan 43a is capable of adjusting a wind speed (air volume) of outside air to the low-temperature side outside air heat exchanger 43, and can be used to adjust a heat amount to the low-temperature side heat medium. The outside air fan 43a corresponds to an example of the heat amount adjustment unit.

The shutter device 47 is disposed on a vehicle front side relative to the low-temperature side outside air heat exchanger 43. The shutter device 47 is configured to rotatably dispose multiple blades in an opening portion of a frame-shaped frame. The multiple blades rotate in conjunction by an operation of an electric actuator (not shown) to adjust an opening area in the opening portion of the frame.

Accordingly, the shutter device 47 is capable of adjusting a flow rate of the outside air OA passing through the low-temperature side outside air heat exchanger 43, and is capable of adjusting a heat exchange capacity of the low-temperature side outside air heat exchanger 43. Accordingly, the shutter device 47 corresponds to an example of the heat amount adjustment unit.

Next, the interior air conditioning unit 60 constituting the heat pump system 1 will be described with reference to FIG. 2. In the heat pump system 1, the interior air conditioning unit 60 is a unit that blows ventilation air with its temperature adjusted by the heat pump cycle 10 to an appropriate location in the vehicle cabin. The interior air conditioning unit 60 is disposed inside a dashboard (that is, an instrument panel) at a foremost portion in the vehicle cabin.

The interior air conditioning unit 60 is configured by accommodating a blower 62, the air-conditioning evaporator 15, the heater core 33, and the like in an air passage provided inside the casing 61 forming an outer shell thereof. The casing 61 forms an air passage for ventilation air to be blown into the vehicle cabin. The casing 61 is formed of a resin (specifically, polypropylene) having a certain degree of elasticity and excellent strength.

Figure 2:
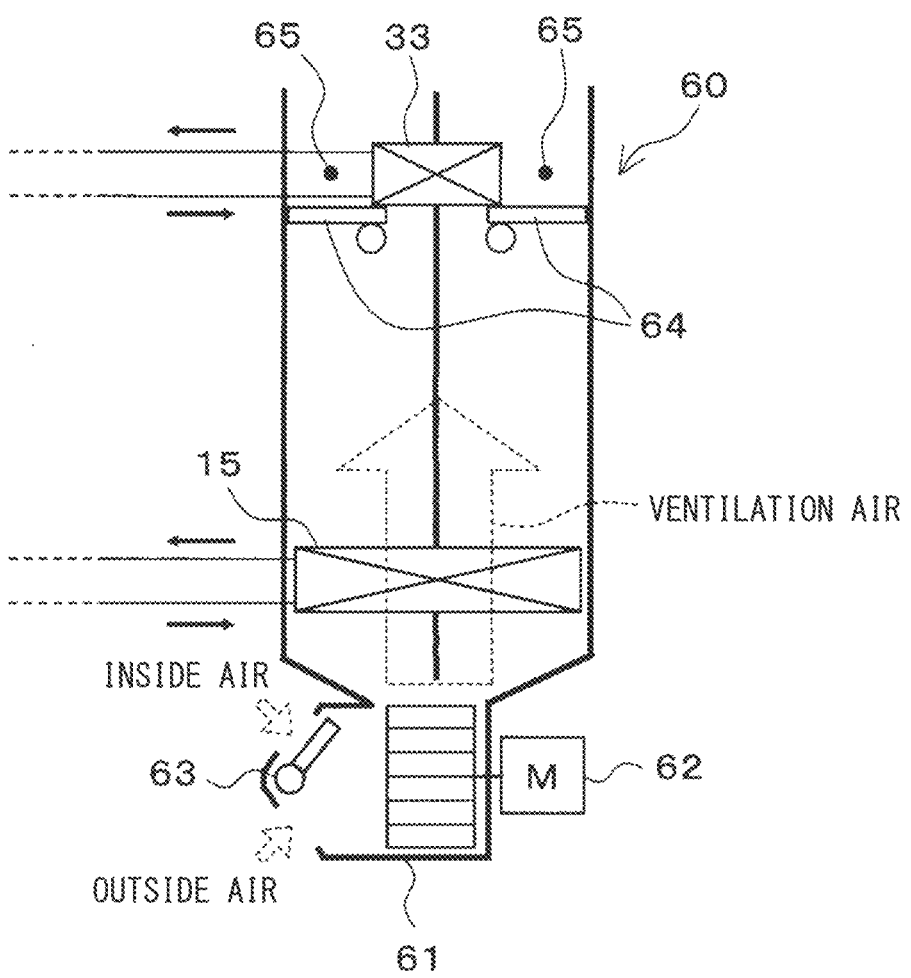
FIG. 2 is a schematic configuration diagram of an interior air conditioning unit according to the first embodiment.

As shown in FIG. 2, an inside-outside air switch device 63 is disposed on the most upstream side of the casing 61 in ventilation air flow. The inside-outside air switch device 63 switches and introduces inside air (air inside the vehicle cabin) and outside air (air outside the vehicle cabin) into the casing 61.

The inside-outside air switch device 63 continuously adjusts opening areas of an inside air introduction port for introducing inside air into the casing 61 and an outside air introduction port for introducing outside air by an inside-outside air switch door, and changes an introducing ratio of an introduction air volume of the inside air and an introduction air volume of the outside air. The inside-outside air switch door is driven by an actuator for the inside-outside air switch door. An operation of the electric actuator is controlled by a control signal output from the energy manager 70.

The blower 62 is disposed downstream of the inside-outside air switch device 63 in the ventilation air flow. The blower 62 includes an electric blower that drives a centrifugal multi-blade fan by an electric motor. The blower 62 blows air sucked in through the inside-outside air switch device 63 toward an inside of the vehicle cabin. A rotation speed (that is, air blowing capacity) of the blower 62 is controlled by a control voltage output from the energy manager 70.

Downstream of the blower 62 in the ventilation air flow, the air-conditioning evaporator 15 and the heater core 33 are disposed in this order with respect to ventilation air flow. That is, the air-conditioning evaporator 15 is disposed upstream of the heater core 33 in the ventilation air flow. Accordingly, in the interior air conditioning unit 60 of the heat pump system 1, at least a part of the ventilation air that has passed through the air-conditioning evaporator 15 can be heated by the heater core 33.

A cold air bypass passage 65 is provided in the casing 61. The cold air bypass passage 65 is an air passage through which the ventilation air that has passed through the air-conditioning evaporator 15 bypasses the heater core 33 and flows downstream.

An air mix door 64 is disposed downstream of the air-conditioning evaporator 15 in the ventilation air flow and upstream of the heater core 33 in the ventilation air flow. The air mix door 64 adjusts an air volume ratio between an air volume passing through the heater core 33 and an air volume passing through the cold air bypass passage 65 in the ventilation air after passing through the air-conditioning evaporator 15.

The air mix door 64 is driven by an electric actuator for driving the air mix door. An operation of the electric actuator is controlled by a control signal output from the energy manager 70.

A mixing space is provided downstream of the heater core 33 in the ventilation air flow. In the mixing space, ventilation air heated by the heater core 33 and ventilation air that has passed through the cold air bypass passage 65 and has not been heated by the heater core 33 are mixed.

Opening holes are disposed at the most downstream portion of the casing 61 in the ventilation air flow to blow out the ventilation air (conditioned air) mixed in the mixing space into the vehicle cabin. As the opening holes, a face opening hole, a foot opening hole, and a defroster opening hole (all not shown) are provided.

The face opening hole is an opening hole for blowing out the conditioned air toward an upper body of an occupant in the vehicle cabin. The foot opening hole is an opening hole for blowing out the conditioned air toward feet of the occupant. The defroster opening hole is an opening hole for blowing out the conditioned air toward an inner surface of window glass on a front surface of the vehicle.

The face opening hole, the foot opening hole, and the defroster opening hole are respectively connected to a face blowing port, a foot blowing port, and a defroster blowing port (all not shown) provided in the vehicle cabin via ducts forming air passages.

Accordingly, the air mix door 64 adjusts the air volume ratio between the air volume passing through the heater core 33 and the air volume passing through the cold air bypass passage 65, thereby adjusting the temperature of the conditioned air mixed in the mixing space. Accordingly, a temperature of the ventilation air (conditioned air) blown out from each blowing port into the vehicle cabin is also adjusted.

A face door, a foot door, and a defroster door (all not shown) are disposed upstream of the face opening hole, the foot opening hole, and the defroster opening hole in the ventilation air flow, respectively. The face door adjusts an opening area of the face opening hole. The foot door adjusts an opening area of the foot opening hole. The defroster door adjusts an opening area of the defroster opening hole.

The face door, the foot door, and the defroster door constitute a blowing mode switching device that switches the blowing port from which the conditioned air is blown. The face door, the foot door, and the defroster door are coupled to a blowing port mode door driving electric actuator via a link mechanism or the like, and are rotationally operate in conjunction with each other. An operation of the electric actuator is controlled by a control signal output from the energy manager 70.

Figure 3:
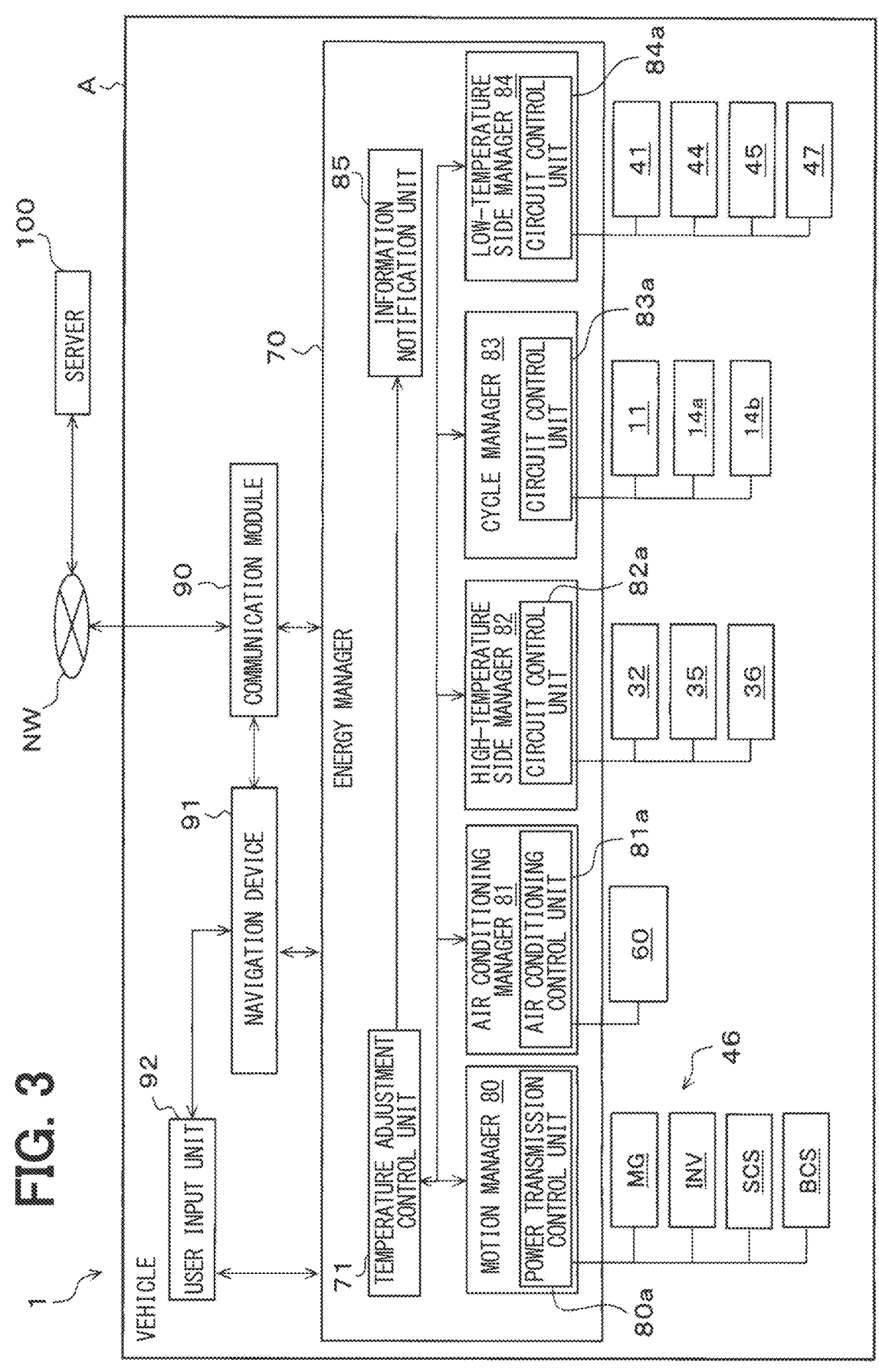
FIG. 3 is a block diagram showing a control system of the heat pump system according to the first embodiment.
Figure 4:
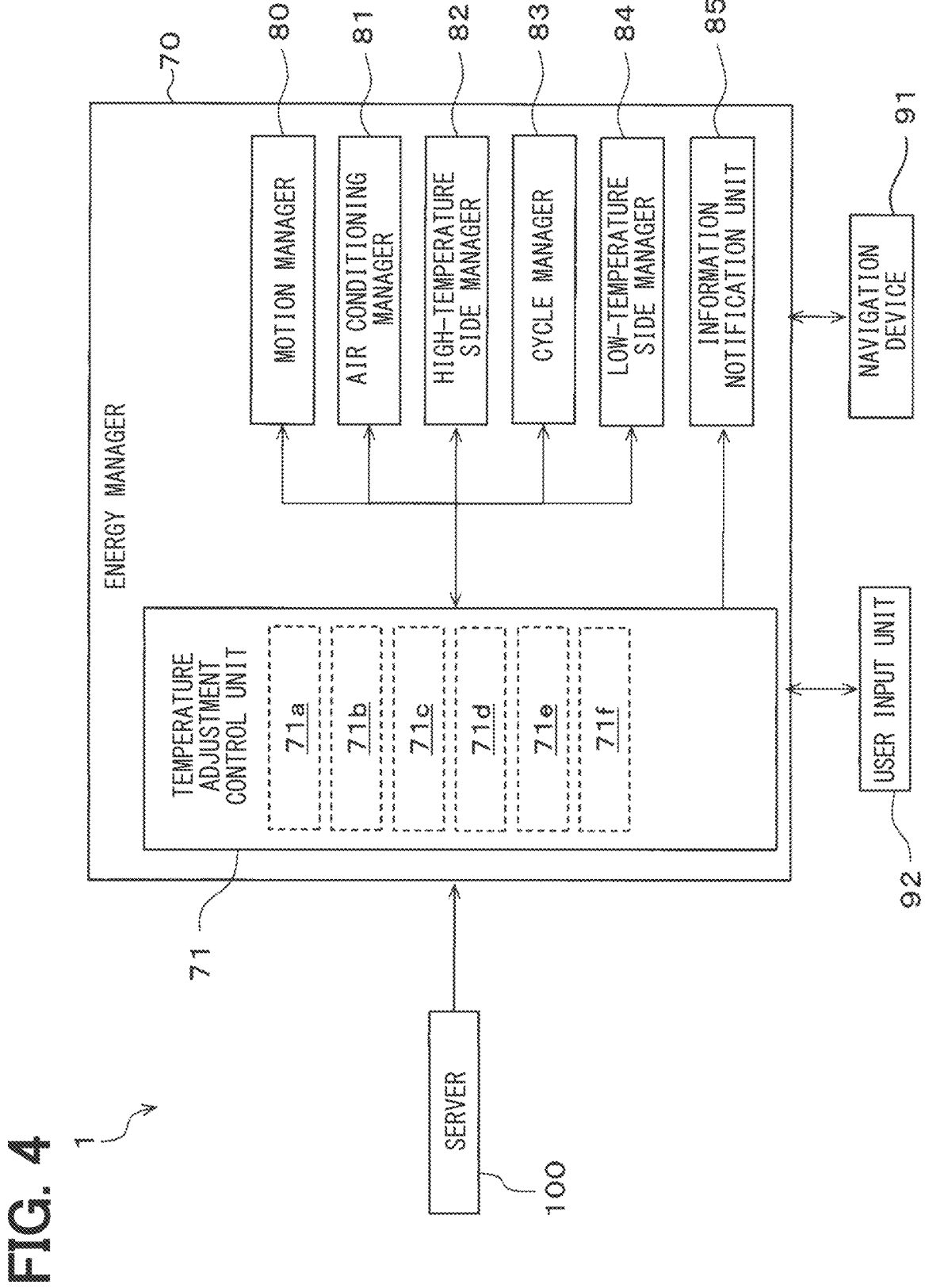
FIG. 4 is a diagram showing a functional configuration of a temperature adjustment control unit according to the first embodiment.

Next, a control system of the heat pump system 1 according to the first embodiment will be described with reference to FIGS. 3 and 4. The energy manager 70 controls an operation of each device constituting the vehicle A including the heat pump system 1. As shown in FIG. 3, the energy manager 70 includes a temperature adjustment control unit 71, a motion manager 80, an air conditioning manager 81, a high-temperature side manager 82, a cycle manager 83, a low-temperature side manager 84, and an information notification unit 85.

The energy manager 70 is implemented by an in-vehicle computer including a processing unit, a RAM, a storage unit, an input and output interface, and a bus connecting these components. The processing unit is hardware for calculation process combined with the RAM. The processing unit executes various processes for implementing functions of function units to be described later by accessing the RAM. The storage unit includes a non-volatile storage medium. The storage unit stores various programs (such as a heat amount adjustment program) executed by the processing unit. A specific configuration and each function unit of the energy manager 70 will be described in detail later.

In addition to the energy manager 70, the vehicle A is mounted with a communication module 90, a navigation device 91, a user input unit 92, multiple consumption domains DEc, and the like.

The communication module 90 is a communication module (Data Communication Module) mounted on the vehicle A. The communication module 90 transmits and receives radio waves to and from a base station around the vehicle A by wireless communication in accordance with a communication standard such as Long Term Evolution (LTE) and 5G. By mounting the communication module 90, the vehicle A becomes a connected car connectable to a network NW.

The communication module 90 is capable of transmitting and receiving information to and from a cloud server 100 and the like through the network NW. The cloud server 100 is an information distribution server disposed on a cloud, and distributes, for example, weather information and road traffic information.

The navigation device 91 is an in-vehicle device that guides a travel path to a destination set by a user. The navigation device 91 performs guidance such as going straight, turning left or right, changing lanes, at an intersection, a branching point, a merging point, or the like by screen display, sound reproduction, or the like. The navigation device 91 is capable of providing, as navigation information, the energy manager 70 with information such as a distance to a destination, a vehicle speed in each traveling section, and a height difference as environmental information.

The travel path may include sections having different speed ranges depending on the traveling section, such as a general road and an expressway. Since a legal speed on the expressway is greater than a legal speed set for general road, it is assumed that an output of a battery required for traveling on the expressway is larger than that required for traveling on the general road.

The travel path may include a traveling section constituted by a plain area and a traveling section constituted by a mountainous area. There is a case where the traveling section for traveling in the mountainous area is constituted by a traveling section in which the vehicle climbs up a slope with an inclination or more. It is assumed that an output of the battery required when traveling on a climbing section is larger than that when traveling on the plain area.

The user input unit 92 is an operation device that receives an input operation by a user who is an occupant in the vehicle A. For example, a user operation of operating the navigation device 91, a user operation of switching between enabling and disabling heating prediction, and a user operation of changing various setting values related to the vehicle A are input to the user input unit 92. The user input unit 92 is capable of providing input information based on a user operation to the energy manager 70.

For example, a steering switch provided on a spoke portion of a steering wheel, a switch and a dial disposed on a center console or the like, and a voice input device for detecting utterances of a driver are mounted on the vehicle A as the user input unit 92. A touch panel or the like of the navigation device 91 may function as the user input unit 92. Further, a user terminal such as a smartphone or a tablet terminal may function as the user input unit 92 by being connected to the energy manager 70 by wire or wirelessly.

The consumption domain is an in-vehicle device group that implements various vehicle functions by using electric power of a battery or the like. One consumption domain includes at least one domain manager, and includes a set of in-vehicle device groups whose power consumption is managed by the domain manager. The multiple consumption domains include a traveling control domain and a temperature adjustment control domain.

The traveling control domain is a consumption domain for controlling travel of vehicle A. The traveling control domain includes the motor generator MG, the inverter INV, a steering control system SCS, a brake control system BCS, and the motion manager 80.

The motor generator MG is a drive source that generates a driving force for causing the vehicle A to travel. The inverter INV controls power running and regeneration by the motor generator MG. The steering control system SCS controls steering of the vehicle A. The brake control system BCS controls a braking force generated in the vehicle A.

During power running by the motor generator MG, the inverter INV converts DC power supplied from the battery into three-phase AC power and supplies the three-phase AC power to the motor generator MG. The inverter INV is capable of adjusting a frequency, a current, and a voltage of the AC power, and controls the driving force generated by the motor generator MG. On the other hand, during regeneration by the motor generator MG, the inverter INV converts AC power into DC power and supplies the DC power to the battery.

The motion manager 80 integrally controls the inverter INV, the steering control system SCS, and the brake control system BCS, and implements traveling of the vehicle A in accordance with a driving operation of the driver. The motion manager 80 functions as a domain manager of the traveling control domain, and comprehensively manages power consumption by the motor generator MG, the inverter INV, the steering control system SCS, and the brake control system BCS.

The motion manager 80 includes a power transmission control unit 80a. The power transmission control unit 80a integrally controls the inverter INV, the steering control system SCS, and the brake control system BCS to execute control related to traveling of the vehicle A.

The temperature adjustment control domain is a consumption domain that performs air conditioning of a living space of the vehicle A and temperature adjustment of the battery. The temperature adjustment control domain includes a consumption domain related to the interior air conditioning unit 60, a consumption domain related to the high-temperature side heat medium circuit 31, a consumption domain related to the heat pump cycle 10, and a consumption domain related to the low-temperature side heat medium circuit 40.

The consumption domain related to the interior air conditioning unit 60 includes component devices of the interior air conditioning unit 60 and the air conditioning manager 81. Examples of the component devices of the interior air conditioning unit 60 include the blower 62, the inside-outside air switch device 63, and the electric actuator of the air mix door 64. The air conditioning manager 81 is a domain manager related to the component devices of the interior air conditioning unit 60, and comprehensively controls the component devices to achieve an air conditioning environment desired by the user. The air conditioning control unit 81a adjusts an air volume of conditioned air and a ratio of inside air and outside air in the conditioned air, and comprehensively manages power consumption of each component device in the interior air conditioning unit 60.

The consumption domain related to the high-temperature side heat medium circuit 31 includes the high-temperature side pump 32, the high-temperature side flow rate adjustment valve 35, the high-temperature side heater 36, and the high-temperature side manager 82. The high-temperature side manager 82 is a domain manager related to a component device of the high-temperature side heat medium circuit 31, and controls flow of the high-temperature side heat medium in the high-temperature side heat medium circuit 31 to be in a desired state.

The high-temperature side manager 82 has a circuit control unit 82a, and controls, by the circuit control unit 82a, a pumping capacity of the high-temperature side heat medium in the high-temperature side pump 32, a flow rate balance in the high-temperature side flow rate adjustment valve 35, and a heating amount of the high-temperature side heat medium in the high-temperature side heater 36.

A high-temperature side heat medium temperature Twh, which is a temperature of the high-temperature side heat medium circulating in the high-temperature side heat medium circuit 31, is input to the high-temperature side manager 82 by multiple temperature sensors disposed in the high-temperature side heat medium circuit 31. Accordingly, the high-temperature side manager 82 is capable of controlling a heat generation amount of the high-temperature side heater 36 and the like using the detected high-temperature side heat medium temperature Twh.

The consumption domain related to the heat pump cycle 10 includes the compressor 11, the first expansion valve 14a, the second expansion valve 14b, and the cycle manager 83. The cycle manager 83 is a domain manager related to component devices of the heat pump cycle 10, and controls a state of the refrigerant circulating in the heat pump cycle 10 to a desired state.

The cycle manager 83 has a circuit control unit 83a, and controls, by the circuit control unit 83a, the refrigerant discharge capacity (rotation speed) of the compressor 11, a pressure reduction amount of the first expansion valve 14a, and a pressure reduction amount of the second expansion valve 14b.

Detection results related to a refrigerant temperature and a refrigerant pressure are input to the cycle manager 83 by a refrigerant temperature sensor and a refrigerant pressure sensor disposed in the heat pump cycle 10. Accordingly, the cycle manager 83 is capable of adjusting the rotation speed of the compressor 11, the throttle opening degree of the first expansion valve 14a, and the like using detected values of the refrigerant temperature and the refrigerant pressure.

The consumption domain related to the low-temperature side heat medium circuit 40 includes the low-temperature side pump 41, the low-temperature side flow rate adjustment valve 44, the low-temperature side heater 45, the shutter device 47, and the low-temperature side manager 84. The low-temperature side manager 84 is a domain manager related to component devices of the low-temperature side heat medium circuit 40, and controls flow of the low-temperature side heat medium in the low-temperature side heat medium circuit 40 to be in a desired state.

The low-temperature side manager 84 has a circuit control unit 84a, and the circuit control unit 84a controls a pumping capacity of the low-temperature side heat medium in the low-temperature side pump 41, a flow rate balance in the low-temperature side flow rate adjustment valve 44, and the like. Further, the circuit control unit 84a controls a heating amount of the low-temperature side heat medium in the low-temperature side heater 45 and an opening area in the shutter device 47.

A low-temperature side heat medium temperature Twl, which is a temperature of the low-temperature side heat medium circulating in the low-temperature side heat medium circuit 40, is input to the low-temperature side manager 84 by multiple temperature sensors disposed in the low-temperature side heat medium circuit 40. Accordingly, the low-temperature side manager 84 is capable of controlling a heat generation amount of the low-temperature side heater 45 and the like using the detected low-temperature side heat medium temperature Twl.

At least one of the temperature sensors that detect the low-temperature side heat medium temperature Twl is disposed on an inlet side of the heat medium passage 16b of the chiller 16, and detects the low-temperature side heat medium temperature Twl of the low-temperature side heat medium flowing into the chiller 16.

As shown in FIG. 3, the energy manager 70 according to the first embodiment includes the temperature adjustment control unit 71, the motion manager 80, the air conditioning manager 81, the high-temperature side manager 82, the cycle manager 83, the low-temperature side manager 84, and the information notification unit 85. As described above, a battery manager, the motion manager 80, and a heat manager are in-vehicle computers that control specific functions (for example, a traveling function and a temperature adjustment function of the vehicle), and constitute a part of the energy manager 70.

The temperature adjustment control unit 71 uses various types of information output from the battery manager, the motion manager 80, and the heat manager to integrally manage use of electric power by each consumption domain. The temperature adjustment control unit 71 includes an in-vehicle computer and constitutes a part of the energy manager 70. The temperature adjustment control unit 71 plays a main role of a control process in the energy manager 70.

The information notification unit 85 is an in-vehicle computer that functions as a domain manager for notification of various information acquired from the cloud server 100 or the like, and constitutes a part of the energy manager 70. A consumption domain for notifying the user of the vehicle A of information is connected to the information notification unit 85. For example, a display or a speaker of the navigation device 91, a display unit disposed on the dashboard (that is, the instrument panel) at the foremost portion in the vehicle cabin, and the like are connected to the information notification unit 85.

Accordingly, the information notification unit 85 is capable of displaying the information specified by the temperature adjustment control unit 71 on the display or the like of the navigation device 91. The information notification unit 85 is capable of outputting the information that is specified by the temperature adjustment control unit 71 from the speaker of the navigation device 91. The display, the speaker, and the like of the navigation device 91 correspond to an example of an information transmission unit.

Power supply to the energy manager 70, which is the in-vehicle computer, is continued even when the vehicle A is in a non-travelable state (for example, an ignition off state). Therefore, the energy manager 70 is capable of activating each function unit and executing a predetermined process even during a non-use period if it is necessary to execute the control.

As described above, in the heat pump system 1, a control sensor group is disposed in order to appropriately perform an air conditioning operation and a device temperature adjustment operation by the heat pump system 1. The control sensor group for controlling a control target device in the heat pump system 1 is connected to the energy manager 70. The control sensor group includes an inside air temperature sensor, an outside air temperature sensor, an insolation sensor, a high-pressure sensor, an evaporator temperature sensor, and a merging portion pressure sensor.

The inside air temperature sensor is an inside air temperature detection unit that detects a temperature inside the vehicle cabin (inside air temperature) Tr. The outside air temperature sensor is an outside air temperature detection unit that detects a vehicle cabin outside air temperature (outside air temperature) Tam. The insolation sensor is an insolation amount detection unit that detects an insolation amount As radiated into the vehicle cabin. The high-pressure sensor is a refrigerant pressure detection unit that detects a high-pressure refrigerant pressure Pd in a refrigerant flow path extending from a discharge port side of the compressor 11 to an inlet side of the first expansion valve 14a or the second expansion valve 14b.

The evaporator temperature sensor is an evaporator temperature detection unit that detects a refrigerant evaporation temperature (evaporator temperature) Tefin in the air-conditioning evaporator 15. The merging portion pressure sensor is a refrigerant pressure detection unit that detects a refrigerant pressure in the second connection portion 13b of the heat pump cycle 10. A merging portion pressure indicates a refrigerant pressure on a low-pressure side of the heat pump cycle 10.

Further, the control sensor group includes a battery temperature sensor, a ventilation air temperature sensor, and a suction air temperature sensor. The battery temperature sensor is a battery temperature detection unit that detects a battery temperature that is a temperature of the battery. The battery temperature sensor includes multiple temperature detection units, and detects temperatures at multiple locations in the battery. Therefore, the energy manager 70 is also capable of detecting a temperature difference between parts of the battery. Further, as a battery temperature TBA, an average value of detected values of the multiple temperature detection units is adopted.

The ventilation air temperature sensor is a ventilation air temperature detection unit that detects a temperature TAV of ventilation air blown into the vehicle cabin. The suction air temperature sensor is a suction air temperature detection unit that detects a suction air temperature, which is a temperature of ventilation air flowing into the air-conditioning evaporator 15. The suction air temperature sensor is disposed inside the casing 61 of the interior air conditioning unit 60 and upstream of the air-conditioning evaporator 15 in the ventilation air flow.

Further, the control sensor group includes multiple heat medium temperature sensors for detecting a temperature of the heat medium in the high-temperature side heat medium circuit 31 and the low-temperature side heat medium circuit 40. The multiple heat medium temperature sensors include a first heat medium temperature sensor to a fifth heat medium temperature sensor. The first heat medium temperature sensor is disposed at an outlet portion of the heat medium passage of the high-temperature side heater 36, and detects a temperature of the high-temperature side heat medium flowing out of the high-temperature side heater 36.

The second heat medium temperature sensor is disposed at an outlet portion of the high-temperature side outside air heat exchanger 34, and detects a temperature of the high-temperature side heat medium that has passed through the high-temperature side outside air heat exchanger 34. The third heat medium temperature sensor is disposed at an inlet portion of the heater core 33, and detects a temperature of the high-temperature side heat medium flowing into the heater core 33.

The fourth heat medium temperature sensor is disposed at an inlet portion of the heat medium passage 16b of the chiller 16, and detects a temperature of the low-temperature side heat medium flowing into the chiller 16. The fifth heat medium temperature sensor is disposed at an outlet portion of the low-temperature side outside air heat exchanger 43, and detects a temperature of the low-temperature side heat medium flowing out of the low-temperature side outside air heat exchanger 43.

In the temperature adjustment control unit 71 of the energy manager 70, a control unit that controls various control target devices connected as a consumption domain and a power supply domain is integrally configured. As shown in FIG. 4, in the temperature adjustment control unit 71, a configuration (hardware and software) that controls an operation of each control target device constitutes a control unit that controls an operation of each control target device.

For example, of the temperature adjustment control unit 71, a configuration that sets a required high-temperature side heat transfer amount Qh as a heat transfer amount from the refrigerant to the high-temperature side heat medium in the heat medium-refrigerant heat exchanger 12 using a target blowing temperature TaO or the like when the vehicle cabin is heated constitutes a high-temperature side heat transfer amount setting unit 71*a*.

Of the temperature adjustment control unit 71, a configuration that sets a target high-temperature side heat medium temperature Twoh as a target value of the high-temperature side heat medium temperature Twh necessary for achieving the required high-temperature side heat transfer amount Qh when the vehicle cabin is heated constitutes a target high-temperature side heat medium temperature setting unit 71*b*.

Of the temperature adjustment control unit 71, a configuration that sets the rotation speed upper limit value Ncul of the compressor 11 according to the traveling speed of the vehicle A constitutes a rotation speed upper limit value setting unit 71*c*. The rotation speed upper limit value setting unit 71*c* sets a rotation speed upper limit value of the compressor 11 to be higher as the traveling speed of the vehicle A is higher.

Of the temperature adjustment control unit 71, a configuration that sets a target low-temperature side heat medium temperature Twol as a target value of the low-temperature side heat medium temperature Twl necessary for achieving a required heating capacity when the vehicle cabin is heated constitutes a target low-temperature side heat medium temperature setting unit 71*d*. The target low-temperature side heat medium temperature setting unit 71*d* is set in accordance with a relationship between the high-temperature side heat transfer amount Qh and the rotation speed upper limit value Ncul of the compressor 11.

Of the temperature adjustment control unit 71, a configuration that estimates a future traveling situation of the vehicle A on which the heat pump system 1 is mounted based on environmental information constitutes a traveling situation estimation unit 71*e*. The future traveling situation of vehicle A indicates a future situation such as a stop or traveling of vehicle A, or a traveling speed range when vehicle A is traveling.

The environmental information includes information provided from an outside of the vehicle A, and may include, for example, center information distributed from the cloud server 100 or the like. The environmental information includes weather information and road traffic information. The weather information includes information indicating an outside air temperature, an insolation amount, a radiant heat amount from a road surface, presence or absence of rain or snow, and the like on a travel path set in the navigation device 91.

Further, the environmental information includes information generated inside the vehicle A among information affecting traveling of the vehicle A. For example, information provided by the navigation device 91, the power supply domain, the consumption domain, and the like corresponds to an example of the environmental information. The information provided from the navigation device 91 includes, in addition to a distance to the destination, the vehicle speed and the height difference in each section, information such as the number of traffic lights (the number of times of stopping), a legal speed, and a degree of inclination of a road.

Information provided from the user input unit 92 may be acquired as the environmental information. In this case, the information may be information input to the user input unit

92 by a user riding in the vehicle A or information input to a user terminal functioning as the user input unit 92 by a user outside the vehicle A. The information may be information input by the user in real time in response to an inquiry from a system such as the energy manager 70, or may be information indicating a setting value recorded by a past operation of the user. An input operation of the user input using the user input unit 92 includes input operations of an automatic switch, an air conditioner switch, an air volume setting switch, a temperature setting switch, and the like.

The automatic switch is operated when setting or canceling automatic control of an air conditioning operation by the heat pump system 1. The air conditioner switch is operated when requesting the air-conditioning evaporator 15 to cool the ventilation air. The air conditioner switch is configured to switch whether to cool the ventilation air according to an input operation of the air conditioner switch. The air volume setting switch is operated when manually setting an air volume of the blower 62. The temperature setting switch is operated when setting a vehicle interior set temperature Tset, which is a target temperature in the vehicle cabin.

Among the environmental information, information provided from the consumption domain is capable of including status information indicating a state of each consumption domain. For example, the status information includes air conditioning information indicating a set temperature of air conditioning of the living space (hereinafter, referred to as "air conditioning request information") and a current temperature, temperature information on a heat medium in a heat medium circuit, and information indicating a state (for example, a current temperature) of the motor generator MG and the inverter INV.

The environmental information is not limited to information including a current actual measurement value, and may include information including a future estimation value. Specifically, a future use schedule can be set for vehicle A.

Of the temperature adjustment control unit 71, a configuration that predicts a possibility that heating in the vehicle cabin is performed in the traveling vehicle A using various types of information acquired as the environmental information constitutes a heating prediction unit 71*f*.

Next, an air conditioning operation of the heat pump system 1 in the first embodiment will be described. As described above, in the heat pump system 1 according to the first embodiment, an operation mode can be appropriately switched from the multiple operation modes. The switching of the operation mode is performed by executing a control program stored in advance in the energy manager 70.

More specifically, in the control program, the target blowing temperature TaO of the ventilation air to be blown into the vehicle cabin is calculated based on a detection signal detected by an air conditioning control sensor group and an operation signal output from the user input unit 92.

Specifically, the target blowing temperature TaO is calculated by the following formula F1.

$$TaO = Kset \times Tset - Kr \times Tr - Kam \times Tam - Ks \times As + C \qquad (F1)$$

Tset is a target temperature in the vehicle cabin set by the temperature setting switch (vehicle interior set temperature), Tr is an inside air temperature detected by the inside air temperature sensor, Tam is an outside air temperature detected by the outside air temperature sensor, and As is an insolation amount detected by the insolation sensor. Kset, Kr, Kam, and Ks are control gains, and C is a constant for correction.

In the control program, when the target blowing temperature TaO is lower than a predetermined cooling reference temperature a in a state where an air conditioner switch of the user input unit 92 is turned on, an air conditioning operation mode is switched to the cooling mode.

In the control program, when the target blowing temperature TaO is equal to or higher than the cooling reference temperature a in a state where the air conditioner switch of the user input unit 92 is turned on, the air conditioning operation mode is switched to the dehumidifying and heating mode. When the target blowing temperature TaO is equal to or higher than the cooling reference temperature a in a state where the air conditioner switch is not turned on, the air conditioning operation mode is switched to the heating mode.

(a) Cooling Mode

The cooling mode is an operation mode in which the ventilation air is cooled by the air-conditioning evaporator 15 using the heat pump cycle 10 and is blown into the vehicle cabin. In the cooling mode, the cycle manager 83 of the energy manager 70 opens the first expansion valve 14*a* at a predetermined throttle opening degree and fully closes the second expansion valve 14*b*.

Accordingly, in the heat pump cycle 10 in the cooling mode, a circulation circuit of the refrigerant flowing through the compressor 11, the heat medium-refrigerant heat exchanger 12, the first expansion valve 14*a*, the air-conditioning evaporator 15, and the compressor 11 in this order is configured.

In this cycle configuration, the energy manager 70 controls an operation of various control target devices connected to an output side to be in a mode suitable for the cooling mode in accordance with detection results of the control sensor group and the like. Specifically, the cycle manager 83 controls the refrigerant discharge capacity of the compressor 11 and the throttle opening degree of the first expansion valve 14*a*, and the air conditioning manager 81 controls the air blowing capacity of the blower 62, an opening degree of the air mix door 64, and the like.

In the high-temperature side heat medium circuit 31 in the cooling mode, the high-temperature side manager 82 controls the high-temperature side pump 32 and the high-temperature side flow rate adjustment valve 35 to be in a state suitable for the cooling mode. Accordingly, in the high-temperature side heat medium circuit 31, the high-temperature side heat medium circulates in the high-temperature side pump 32, the heat medium-refrigerant heat exchanger 12, the high-temperature side heater 36, the high-temperature side flow rate adjustment valve 35, the high-temperature side outside air heat exchanger 34, and the high-temperature side pump 32 in this order.

In the low-temperature side heat medium circuit 40 in the cooling mode, since the low-pressure refrigerant does not flow into the chiller 16, the low-temperature side manager 84 may stop circulation of the low-temperature side heat medium in the low-temperature side heat medium circuit 40.

Accordingly, in the heat pump system 1 in the cooling mode, the ventilation air cooled by the air-conditioning evaporator 15 is blown into the vehicle cabin, so that the vehicle cabin can be cooled.

(b) Heating Mode

The heating mode is an operation mode in which the heat pump cycle 10 is used to pump up heat of the low-temperature side heat medium, the heater core 33 heats the ventilation air, and the ventilation air is blown into the vehicle cabin. In the heating mode, the cycle manager 83 fully closes the first expansion valve 14*a* and opens the second expansion valve 14*b* at a predetermined throttle opening degree. Accordingly, in the heat pump cycle 10 in the heating mode, a circulation circuit of the refrigerant in which the refrigerant circulates is configured in the order of the compressor 11, the heat medium-refrigerant heat exchanger 12, the second expansion valve 14*b*, the chiller 16, and the compressor 11.

In this cycle configuration, the energy manager 70 controls an operation of various control target devices connected to the output side to be in a mode suitable for the heating mode in accordance with detection results of the control sensor group and the like. Specifically, the cycle manager 83 controls the refrigerant discharge capacity of the compressor 11 and a throttle opening degree of the second expansion valve 14*b*, and the air conditioning manager 81 controls the air blowing capacity of the blower 62, the opening degree of the air mix door 64, and the like.

In the high-temperature side heat medium circuit 31 in the heating mode, the high-temperature side manager 82 controls the high-temperature side pump 32, the high-temperature side flow rate adjustment valve 35, and the high-temperature side heater 36 to be in a state suitable for the heating mode. Accordingly, in the high-temperature side heat medium circuit 31, the high-temperature side heat medium circulates in the high-temperature side pump 32, the heat medium-refrigerant heat exchanger 12, the high-temperature side heater 36, the high-temperature side flow rate adjustment valve 35, the heater core 33, and the high-temperature side pump 32 in this order.

At this time, the high-temperature side manager 82 may cause a part of the high-temperature side heat medium that has flowed into the high-temperature side outside air heat exchanger 34 from the high-temperature side heater 36 to flow out to a suction port side of the high-temperature side pump 32 via the high-temperature side outside air heat exchanger 34. Accordingly, since a part of the heat of the high-temperature side heat medium is released to the outside air by the high-temperature side outside air heat exchanger 34, a heating capacity of the heater core 33 can be adjusted to a desired state.

Regarding the low-temperature side heat medium circuit 40 in the heating mode, the low-temperature side manager 84 controls the low-temperature side pump 41, the outside air fan 43*a*, the low-temperature side flow rate adjustment valve 44, the heat generation device 46, and the shutter device 47 so that a circulation path of the low-temperature side heat medium is in a state suitable for the heating mode. Specifically, the low-temperature side manager 84 controls the pumping capacity of the low-temperature side pump 41, the air blowing capacity of the outside air fan 43*a*, the flow rate balance of the low-temperature side flow rate adjustment valve 44, a heat generation amount of the heat generation device 46, an opening degree of the shutter device 47, and the like.

Accordingly, in the low-temperature side heat medium circuit 40, the low-temperature side heat medium circulates in the low-temperature side pump 41, the chiller 16, the heat generation device 46, the battery heat exchanging unit 42, the low-temperature side flow rate adjustment valve 44, the low-temperature side outside air heat exchanger 43, the low-temperature side heater 45, and the low-temperature side pump 41 in this order.

According to this aspect, heat released from the battery and the heat generation device 46 can be stored in the low-temperature side heat medium circulating in the low-temperature side heat medium circuit 40, and can be used as a heat source for heating the vehicle cabin. The low-temperature side manager 84 is capable of adjusting a heat amount for heating the low-temperature side heat medium by the low-temperature side heater 45, and is capable of adjusting a heat amount to be exchanged between the low-temperature side heat medium and the outside air in the low-temperature side outside air heat exchanger 43 by the outside air fan 43a and the shutter device 47. Accordingly, a heat amount of the low-temperature side heat medium can be adjusted to a desired state, and a heat source for heating can be ensured.

The heat pump system 1 in the heating mode is capable of performing a heating operation in which the heat of the low-temperature side heat medium in the low-temperature side heat medium circuit 40 is pumped up in the heat pump cycle 10 and used to heat the ventilation air via the high-temperature side heat medium circuit 31.

(c) Dehumidifying and Heating Mode

The dehumidifying and heating mode is an operation mode in which the ventilation air cooled by the air-conditioning evaporator 15 is heated by the heater core 33 using the heat pump cycle 10 and is blown into the vehicle cabin. In the dehumidifying and heating mode, the cycle manager 83 opens the first expansion valve 14a and the second expansion valve 14b at a predetermined throttle opening degree.

Accordingly, in the heat pump cycle 10 in the dehumidifying and heating mode, the refrigerant circulates in the compressor 11, the heat medium-refrigerant heat exchanger 12, the first expansion valve 14a, the air-conditioning evaporator 15, and the compressor 11 in this order. At the same time, the refrigerant circulates in the compressor 11, the heat medium-refrigerant heat exchanger 12, the second expansion valve 14b, the chiller 16, and the compressor 11 in this order. That is, in the heat pump cycle 10 in the dehumidifying and heating mode, a refrigerant circulation circuit is configured in which the air-conditioning evaporator 15 and the chiller 16 are connected in parallel to the flow of the refrigerant that has flowed out of the heat medium-refrigerant heat exchanger 12.

In this cycle configuration, the energy manager 70 controls an operation of various control target devices connected to the output side to be in a mode suitable for the dehumidifying and heating mode in accordance with detection results of the control sensor group and the like. Specifically, the cycle manager 83 controls the refrigerant discharge capacity of the compressor 11 and the throttle opening degrees of the first expansion valve 14a and the second expansion valve 14b, and the air conditioning manager 81 controls the air blowing capacity of the blower 62, the opening degree of the air mix door 64, and the like.

In the high-temperature side heat medium circuit 31 in the dehumidifying and heating mode, the high-temperature side manager 82 controls the high-temperature side pump 32, the high-temperature side flow rate adjustment valve 35, and the high-temperature side heater 36 to be in a state suitable for the dehumidifying and heating mode. Accordingly, in the high-temperature side heat medium circuit 31, the high-temperature side heat medium circulates in the high-temperature side pump 32, the heat medium-refrigerant heat exchanger 12, the high-temperature side heater 36, the heater core 33, and the high-temperature side flow rate adjustment valve 35, the high-temperature side heater 36, heater core 33, and the high-temperature side pump 32 in this order.

Regarding the low-temperature side heat medium circuit 40 in the dehumidifying and heating mode, the low-temperature side manager 84 controls the low-temperature side pump 41, the outside air fan 43a, the low-temperature side flow rate adjustment valve 44, and the shutter device 47 so as to be in a state suitable for the dehumidifying and heating mode. Specifically, the low-temperature side manager 84 controls the pumping capacity of the low-temperature side pump 41, the air blowing capacity of the outside air fan 43a, the flow rate balance of the low-temperature side flow rate adjustment valve 44, a heat generation amount of the heat generation device 46, an opening degree of the shutter device 47, and the like.

As a result, in the low-temperature side heat medium circuit 40, the low-temperature side heat medium circulates in the low-temperature side pump 41, the chiller 16, the heat generation device 46, the battery heat exchanging unit 42, the low-temperature side flow rate adjustment valve 44, the low-temperature side outside air heat exchanger 43, the low-temperature side heater 45, and the low-temperature side pump 41 in this order.

According to this aspect, heat released from the battery and the heat generation device 46 can be stored in the low-temperature side heat medium circulating in the low-temperature side heat medium circuit 40, and can be used as a heat source for heating the vehicle cabin. The low-temperature side manager 84 is capable of adjusting a heat amount for heating the low-temperature side heat medium by the low-temperature side heater 45, and is capable of adjusting a heat amount to be exchanged between the low-temperature side heat medium and the outside air in the low-temperature side outside air heat exchanger 43 by the outside air fan 43a and the shutter device 47. Accordingly, a heat amount of the low-temperature side heat medium can be adjusted to a desired state, and a heat source for heating can be ensured.

The heat pump system 1 in the dehumidifying and heating mode is capable of performing a dehumidifying and heating operation in which the ventilation air dehumidified by the air-conditioning evaporator 15 is heated using the heat of the low-temperature side heat medium in the low-temperature side heat medium circuit 40.

Next, processing contents of the heat amount adjustment program according to the first embodiment will be described with reference to FIGS. 5 to 8. The heat amount adjustment program according to the first embodiment is executed in order to appropriately adjust various heat amounts used as a heat source for heating the vehicle cabin during the heating operation in the heat pump system 1.

As described above, the heat amount adjustment program according to the first embodiment is stored in the storage unit of the energy manager 70, and is read and executed by the temperature adjustment control unit 71 constituting the processing unit.

Figure 5:
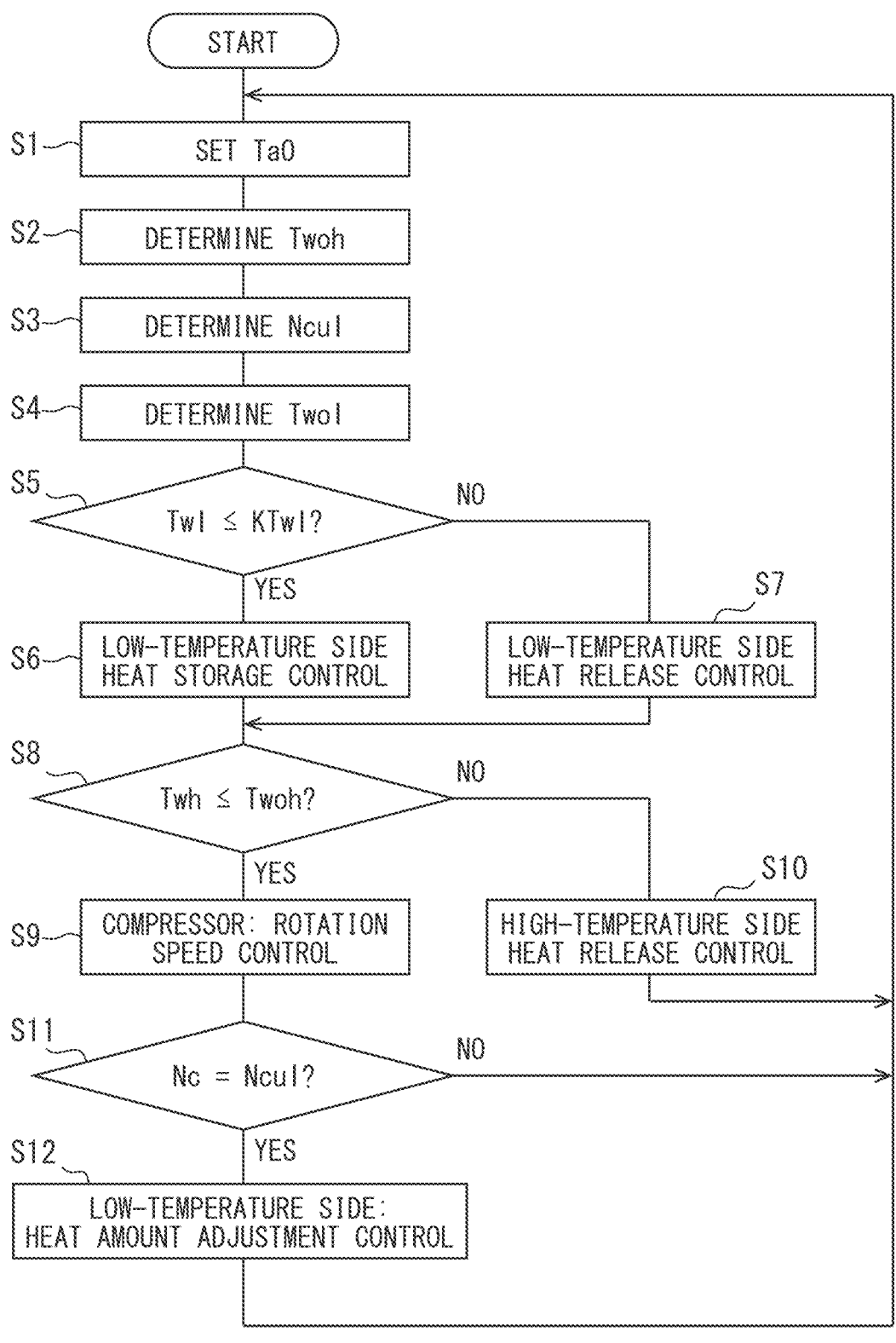
FIG. 5 is a flowchart related to a heat amount adjustment program during a heating operation according to the first embodiment.

As shown in FIG. 5, first, in step S1, the target blowing temperature TaO is set. The target blowing temperature TaO is a target value related to a temperature of the ventilation air supplied to the vehicle cabin that is the space to be air conditioned during heating. As described above, the target blowing temperature TaO is calculated according to the vehicle interior set temperature Tset, the inside air temperature Tr, the outside air temperature Tam, the insolation amount As, and the like, and according to the formula F1.

In step S2, the target high-temperature side heat medium temperature Twoh, which is a temperature of the high-temperature side heat medium necessary for achieving the target blowing temperature TaO, is set. The target high-temperature side heat medium temperature Twoh is calculated using a suction air temperature with respect to the heater core 33, a blowing air volume supplied into the vehicle cabin, the target blowing temperature TaO, and the like. The suction air temperature with respect to the heater core 33 is calculated using an inside-outside air ratio in the inside-outside air switch device 63, the inside air temperature Tr, the outside air temperature Tam, and the like.

In step S3, the rotation speed upper limit value Ncul of the compressor 11 in the heat pump cycle 10 is determined according to the traveling speed of the vehicle A. The rotation speed upper limit value Ncul of the compressor 11 means an upper limit value of the refrigerant discharge capacity of the compressor 11, and a rotation speed Nc of the compressor 11 is controlled so as not to exceed the rotation speed upper limit value Ncul.

Figure 6:
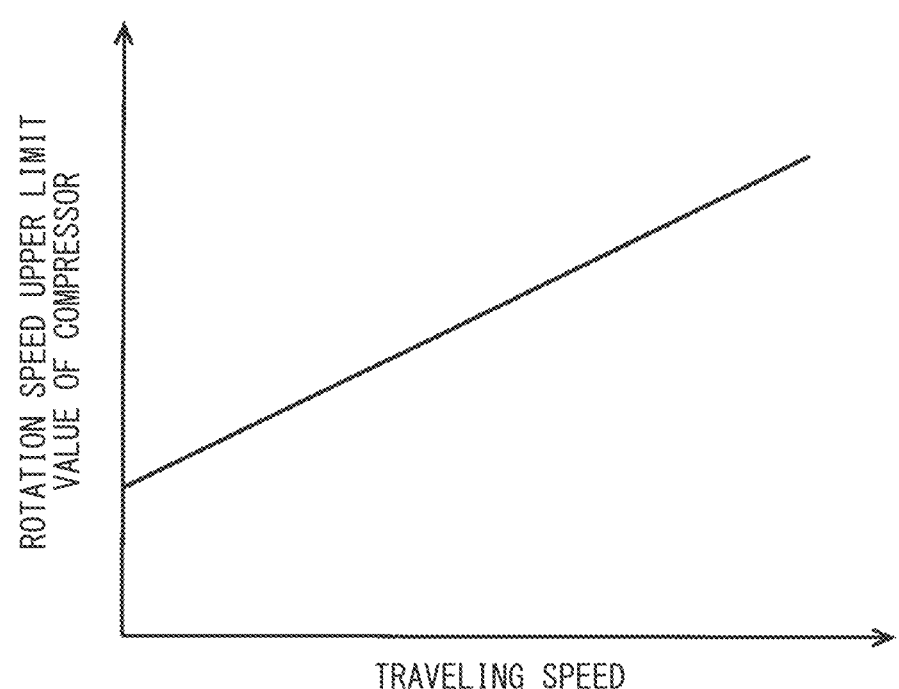
FIG. 6 is a diagram showing a relationship between a traveling speed of a vehicle and a rotation speed upper limit value of a compressor.

In the first embodiment, the rotation speed upper limit value Ncul of the compressor 11 is determined according to a control table stored in the storage unit of the energy manager 70. As shown in FIG. 6, in the control table, the traveling speed of the vehicle A is associated so as to be proportional to the rotation speed upper limit value Ncul of the compressor 11, and it is determined that the higher the traveling speed of the vehicle A is, the larger the rotation speed upper limit value Ncul of the compressor 11 is.

Accordingly, in step S3, the rotation speed upper limit value Ncul of the compressor 11 in the heat pump cycle 10 is determined based on information on the traveling speed of the vehicle A acquired from the motion manager 80 and the control table shown in FIG. 6.

In the first embodiment, as shown in FIG. 6, the traveling speed of the vehicle A and the rotation speed upper limit value Ncul of the compressor 11 are determined to be in a proportional relationship, but the invention is not limited to this aspect. Various aspects can be adopted as long as a relationship is such that the higher the traveling speed of the vehicle A is, the larger the rotation speed upper limit value Ncul of the compressor 11 is. For example, two or more rotation speed upper limit values Ncul may be associated with each other according to the traveling speed range, such as the rotation speed upper limit value Ncul when the traveling speed of the vehicle A is low and the rotation speed upper limit value Ncul when the traveling speed of the vehicle A is high.

In step S4, the target low-temperature side heat medium temperature Twol necessary for achieving the target blowing temperature TaO is set. As described above, in the heating operation of the heat pump system 1, the heat of the low-temperature side heat medium is pumped up to the high-temperature side heat medium circuit 31 by the heat pump cycle 10, and is used to heat the ventilation air in the heater core 33. Accordingly, the target low-temperature side heat medium temperature Twol is set corresponding to a target value of a heat amount usable as the heating heat source in the low-temperature side heat medium circuit 40.

When the target low-temperature side heat medium temperature Twol is set, first, the high-temperature side heat transfer amount Qh is calculated. The high-temperature side heat transfer amount Qh is a heat amount heat-transferred from the high-pressure refrigerant to the high-temperature side heat medium in the heat medium-refrigerant heat exchanger 12, and means a heat amount necessary for achieving the target blowing temperature TaO. The high-temperature side heat transfer amount Qh is calculated using, for example, the target blowing temperature TaO, the suction air temperature with respect to the heater core 33, and the blowing air volume supplied into the vehicle cabin, and is calculated by multiplying a temperature difference between the target blowing temperature TaO and the suction air temperature by the blowing air volume supplied into the vehicle cabin.

Figure 7:
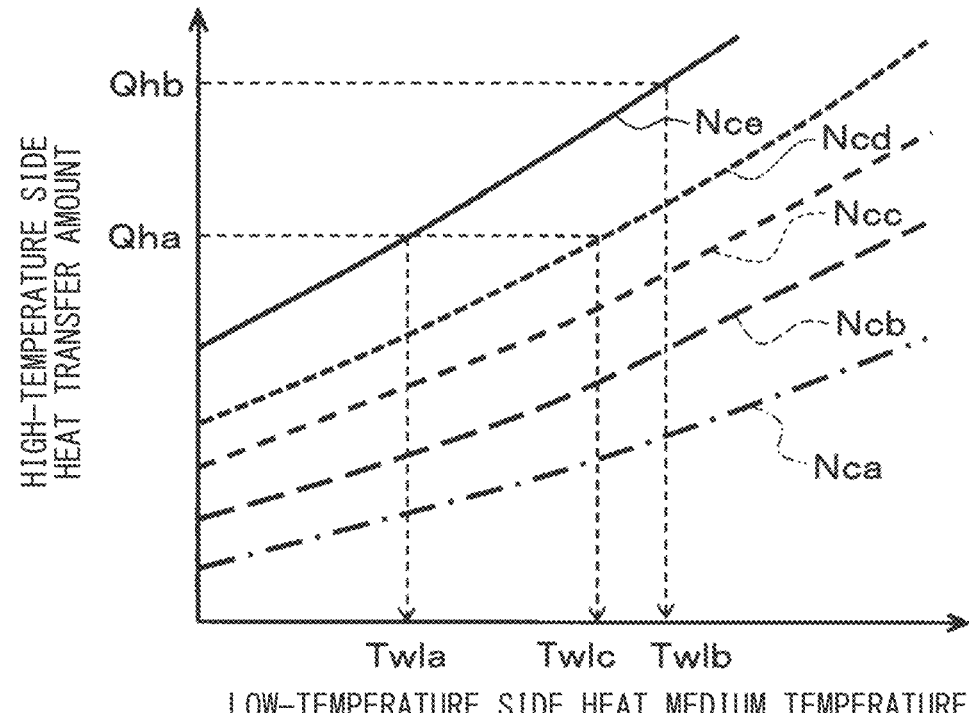
FIG. 7 is a characteristic diagram showing a relationship between a rotation speed of the compressor, a high-temperature side heat transfer amount, and a low-temperature side heat medium temperature.
Figure 8:
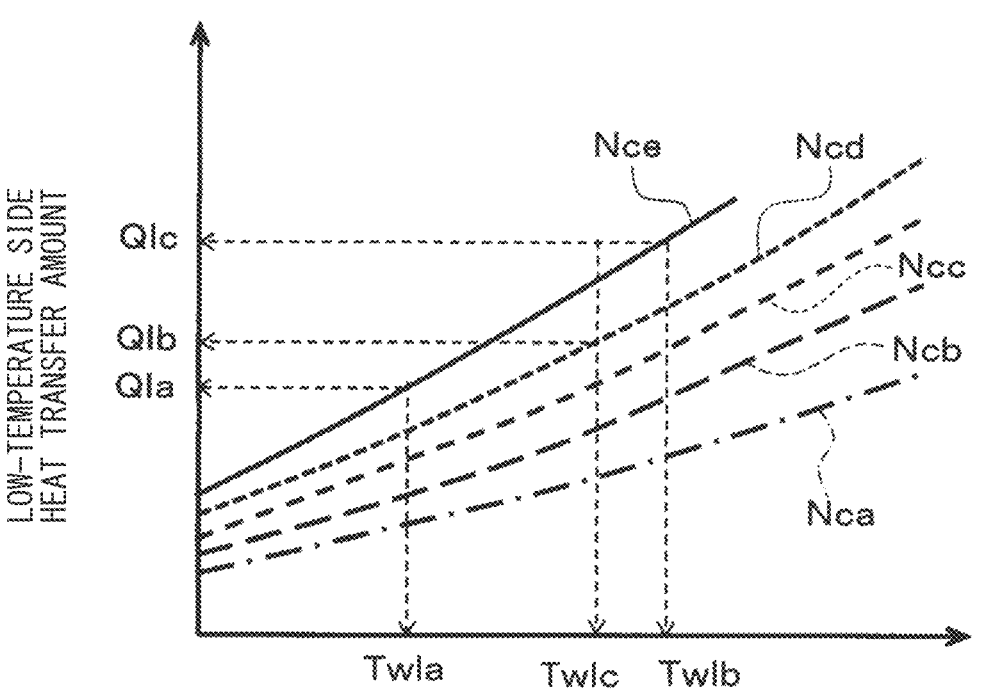
FIG. 8 is a characteristic diagram showing a relationship between a rotation speed of the compressor, a low-temperature side heat transfer amount, and a low-temperature side heat medium temperature.

In the heat pump system 1, relationships shown in FIGS. 7 and 8 are recognized among the high-temperature side heat transfer amount Qh, the rotation speed upper limit value Ncul of the compressor 11, the low-temperature side heat medium temperature Twl, and a low-temperature side heat transfer amount Ql. In FIGS. 7 and 8, five values are determined as the rotation speed upper limit value Ncul of the compressor 11, and the values are shown in the order of Nca, Ncb, Ncc, Ncd, and Nce from the smaller rotation speed upper limit value Ncul.

The high-temperature side heat transfer amount Qh corresponding to the predetermined target blowing temperature TaO is referred to as a high-temperature side heat transfer amount Qha, and the high-temperature side heat transfer amount Qh corresponding to a higher target blowing temperature TaO is referred to as a high-temperature side heat transfer amount Qhb. In FIGS. 7 and 8, Qla, Qlb, and Qlc are shown as the low-temperature side heat transfer amount Ql, and the low-temperature side heat transfer amount Qla corresponds to a low-temperature side heat medium temperature Twla. That is, the low-temperature side heat transfer amount Qla and the high-temperature side heat transfer amount Qha are associated with each other via the low-temperature side heat medium temperature Twla. The low-temperature side heat transfer amount Qlc corresponds to a low-temperature side heat medium temperature Twlb. Accordingly, the low-temperature side heat transfer amount Qlc and the high-temperature side heat transfer amount Qhb are associated with each other via the low-temperature side heat medium temperature Twlb.

As shown in FIGS. 7 and 8, in the heat pump system 1, the high-temperature side heat transfer amount Qh determined to achieve the target blowing temperature TaO is associated with the low-temperature side heat medium temperature Twl for each rotation speed upper limit value Ncul of the compressor 11. A correspondence is made such that the larger the high-temperature side heat transfer amount Qh is, the higher the low-temperature side heat medium temperature Twl is.

In the heat pump system 1, the heat amount pumped up from the low-temperature side heat medium by the chiller 16 is used for heating the high-temperature side heat medium in the heat medium-refrigerant heat exchanger 12. Accordingly, the high-temperature side heat transfer amount Qh determined as described above corresponds to the low-temperature side heat transfer amount Ql that is a heat transfer amount from the low-temperature side heat medium to the low-pressure refrigerant in the chiller 16.

That is, the low-temperature side heat transfer amount Ql determined to achieve the target blowing temperature TaO is also associated with the low-temperature side heat medium temperature Twl for each rotation speed upper limit value Ncul of the compressor 11. Specifically, as the rotation speed upper limit value of the compressor 11 increases in the order of Nca, Ncb, Ncc, Ncd, and Nce, the low-temperature side heat medium temperature Twl decreases.

Using the relationships shown in FIGS. 7 and 8, for example, a case where the high-temperature side heat transfer amount Qh required during the heating operation increases from Qha to Qhb is to be considered. It is understood that in a state where the rotation speed upper limit value Ncul of the compressor 11 is Nce, a request for the high-temperature side heat transfer amount Qhb cannot be achieved unless the low-temperature side heat medium temperature Twl is increased from Twla to Twlb. Accordingly, Twlb is determined as the target low-temperature side heat medium temperature Twol in this case.

Next, a case where the rotation speed upper limit value Ncul of the compressor 11 is limited from Nce to Ncd in a state where the high-temperature side heat transfer amount Qh required during the heating operation is Qha is to be considered. In this case, it is understood that in a state where the rotation speed upper limit value Ncul of the compressor 11 is Ncd and the low-temperature side heat medium temperature is Twla, the required high-temperature side heat transfer amount Qha is insufficient.

From the relationships shown in FIGS. 7 and 8, it is understood that in order to achieve the required high-temperature side heat transfer amount Qha in a state where the rotation speed upper limit value Ncul of the compressor 11 is limited to Ncd, it is necessary to increase the low-temperature side heat medium temperature Twl from Twla to Twlc. That is, Twlc is determined as the target low-temperature side heat medium temperature Twol in this case.

Accordingly, in step S4, the low-temperature side heat transfer amount Ql and the target low-temperature side heat medium temperature Twol for achieving the set high-temperature side heat transfer amount Qh are determined under a condition that the refrigerant discharge capacity of the compressor 11 conforms to the rotation speed upper limit value Ncul set in step S3. As is understood from the relationships shown in FIGS. 7 and 8, as the rotation speed upper limit value Ncul of the compressor 11, the target low-temperature side heat medium temperature Twol for achieving the high-temperature side heat transfer amount Qh is individually associated with each of two or more values.

When proceeding to step S5, it is determined whether the current low-temperature side heat medium temperature Twl is equal to or lower than a predetermined reference value KTwl. The reference value KTwl means an upper limit value of the low-temperature side heat medium temperature Twl determined by a relationship with the component devices of the low-temperature side heat medium circuit 40. Therefore, in step S5, it is determined whether the low-temperature side heat medium has an excess heat amount in relation to the heating operation.

When the low-temperature side heat medium temperature Twl is equal to or lower than the reference value KTwl, the process proceeds to step S6, and low-temperature side heat storage control is executed. The low-temperature side heat storage control controls operations of the component devices of the low-temperature side heat medium circuit 40 so as to store waste heat of the heat generation device 46 and the like as much as possible in the low-temperature side heat medium circulating in the low-temperature side heat medium circuit 40. Specifically, waste heat generated by an operation of the heat generation device 46, heat generated by an input and output of the battery via the battery heat exchanging unit 42, heat generated by the low-temperature side heater 45, and the like are stored in the low-temperature side heat medium. When the low-temperature side heat storage control ends, the process proceeds to step S8.

On the other hand, when the low-temperature side heat medium temperature Twl is higher than the reference value KTwl, the process proceeds to step S7, and low-temperature side heat release control is executed. The low-temperature side heat release control controls operations of the component devices of the low-temperature side heat medium circuit 40 so as to release excess heat of the low-temperature side heat medium circulating in the low-temperature side heat medium circuit 40 to the outside air OA.

Specifically, the low-temperature side heat release control is implemented by controlling a heat exchange capacity between the low-temperature side heat medium in the low-temperature side outside air heat exchanger 43 and the outside air OA. The heat exchange capacity between the low-temperature side heat medium and the outside air may be adjusted, for example, by adjusting a flow rate of the low-temperature side heat medium passing through the low-temperature side outside air heat exchanger 43 by a pumping amount of the low-temperature side heat medium by the low-temperature side pump 41. The heat exchange capacity of the low-temperature side outside air heat exchanger 43 may be adjusted by adjusting a flow rate balance of the low-temperature side heat medium flowing into the low-temperature side outside air heat exchanger 43 by the low-temperature side flow rate adjustment valve 44. The heat exchange capacity may be adjusted by adjusting an opening area of the shutter device 47 and a blowing air volume of the outside air fan 43a and adjusting a flow rate of the outside air OA passing through the low-temperature side outside air heat exchanger 43. When the low-temperature side heat release control ends, the process proceeds to step S8.

In other words, the low-temperature side heat storage control in step S6 can be referred to as control for reducing a heat release amount to the outside air OA in relation to heat of the low-temperature side heat medium. Therefore, in the low-temperature side heat storage control, the low-temperature side pump 41, the low-temperature side flow rate adjustment valve 44, the outside air fan 43a, and the shutter device 47 in the low-temperature side heat medium circuit 40 are operated in a manner opposite to the low-temperature side heat release control.

In step S8, it is determined whether the high-temperature side heat medium temperature Twh is equal to or lower than the target high-temperature side heat medium temperature Twoh. That is, it is determined whether the heat of the high-temperature side heat medium is sufficient in relation to the heating operation aiming at the target blowing temperature TaO.

When the high-temperature side heat medium temperature Twh is equal to or lower than the target high-temperature side heat medium temperature Twoh, rotation speed control over the compressor 11 is executed because the heat of the high-temperature side heat medium is insufficient for the heating operation aiming at the target blowing temperature TaO. In the rotation speed control over the compressor 11, the rotation speed of the compressor 11 is controlled such that the high-temperature side heat medium temperature Twh of the high-temperature side heat medium flowing through the heat medium-refrigerant heat exchanger 12 approaches the target high-temperature side heat medium temperature Twoh determined based on the target blowing temperature TaO.

Accordingly, a heat absorption amount from the low-temperature side heat medium to the refrigerant in the chiller 16 and a heat release amount from the high-pressure refrigerant to the high-temperature side heat medium in the heat medium-refrigerant heat exchanger 12 are adjusted using the refrigerant discharge capacity of the compressor 11 as an index. The refrigerant discharge capacity of the compressor 11 is adjusted such that the high-temperature side heat medium temperature Twh approaches the target high-temperature side heat medium temperature Twoh. As a result, since the heat absorption amount from the low-temperature side heat medium in the chiller 16 is also adjusted, it can be said that the low-temperature side heat medium temperature Twl is adjusted.

According to the heat pump system 1, since the operation is performed on the premise of the processes of step S5 to step S7, it is possible to reduce energy consumption related to the operation of the heat pump cycle 10. When the rotation speed control over the compressor 11 ends, the process proceeds to step S11.

On the other hand, when the high-temperature side heat medium temperature Twh is higher than the target high-temperature side heat medium temperature Twoh, in step S10, high-temperature side heat release control is executed to release excess heat of the high-temperature side heat medium in relation to the heating operation aiming at the target blowing temperature TaO. In the high-temperature side heat release control, operations of component devices of the high-temperature side heat medium circuit 31 are controlled such that the high-temperature side heat medium temperature Twh approaches the target high-temperature side heat medium temperature Twoh.

Specifically, the high-temperature side heat release control is implemented by controlling a heat exchange capacity between the high-temperature side heat medium in the high-temperature side outside air heat exchanger 34 and the outside air OA. The heat exchange capacity between the high-temperature side heat medium and the outside air may be adjusted, for example, by adjusting a flow rate of the high-temperature side heat medium passing through the high-temperature side outside air heat exchanger 34 by a pumping amount of the high-temperature side heat medium by the high-temperature side pump 32. The heat exchange capacity of the high-temperature side outside air heat exchanger 34 may be adjusted by adjusting a flow rate balance of the high-temperature side heat medium flowing into the high-temperature side outside air heat exchanger 34 by the high-temperature side flow rate adjustment valve 35. When the high-temperature side heat release control ends, the process returns to step S1.

In step S11, in the rotation speed control over the compressor 11, it is determined whether the rotation speed Nc of the compressor 11 is the rotation speed upper limit value Ncul set in step S3. That is, it is determined whether a maximum refrigerant discharge capacity of the compressor 11 is used in the rotation speed control over the compressor 11. When the rotation speed Nc of the compressor 11 is not the rotation speed upper limit value Ncul, it is determined that there is a margin in the refrigerant discharge capacity due to performance of the compressor 11, and the process returns to step S1.

On the other hand, when the rotation speed Nc of the compressor 11 is the rotation speed upper limit value Ncul, in step S12, heat amount adjustment control in the low-temperature side heat medium circuit 40 is executed. When the process proceeds to step S12, the compressor 11 is operated to the rotation speed upper limit value Ncul by using heat of the low-temperature side heat medium at a current time point as a heat source, and the low-temperature side heat medium temperature Twl is lower than the target low-temperature side heat medium temperature Twol.

Therefore, in order to ensure the heat amount necessary for achieving the target blowing temperature TaO, the heat amount adjustment control is executed in which the component devices in the low-temperature side heat medium circuit 40 are operated to intentionally generate heat. Specifically, for example, the inverter INV and the like, which are the heat generation devices 46, are operated in an inefficient manner different from normal, thereby increasing a heat generation amount than normal. Regarding the battery, an input and an output to and from the battery are performed inefficiently, thereby increasing a heat generation amount in the battery and increasing heat of the low-temperature side heat medium via the battery heat exchanging unit 42. By heating the low-temperature side heat medium with the low-temperature side heater 45, the temperature may be adjusted to the target low-temperature side heat medium temperature Twol. When the heat amount adjustment control ends, the process returns to step S1.

Thus, by executing the heat amount adjustment control on the low-temperature side heat medium circuit 40 in step S12, the low-temperature side heat medium temperature Twl can be adjusted to the target low-temperature side heat medium temperature Twol. The heat of the low-temperature side heat medium is pumped up by the heat pump cycle 10 and used for heating the high-temperature side heat medium. That is, the heat amount adjustment control in step S12 adjusts the low-temperature side heat medium temperature Twl such that the low-temperature side heat medium temperature Twl approaches the target high-temperature side heat medium temperature Twoh.

By executing the heat amount adjustment program, the heat pump system 1 is capable of ensuring the heat amount on a low-temperature side heat medium circuit 40 side necessary for the heating operation aiming at the target blowing temperature TaO, and is capable of utilizing the heat on the low-temperature side heat medium circuit 40 side when the heating operation is performed.

Figure 9:
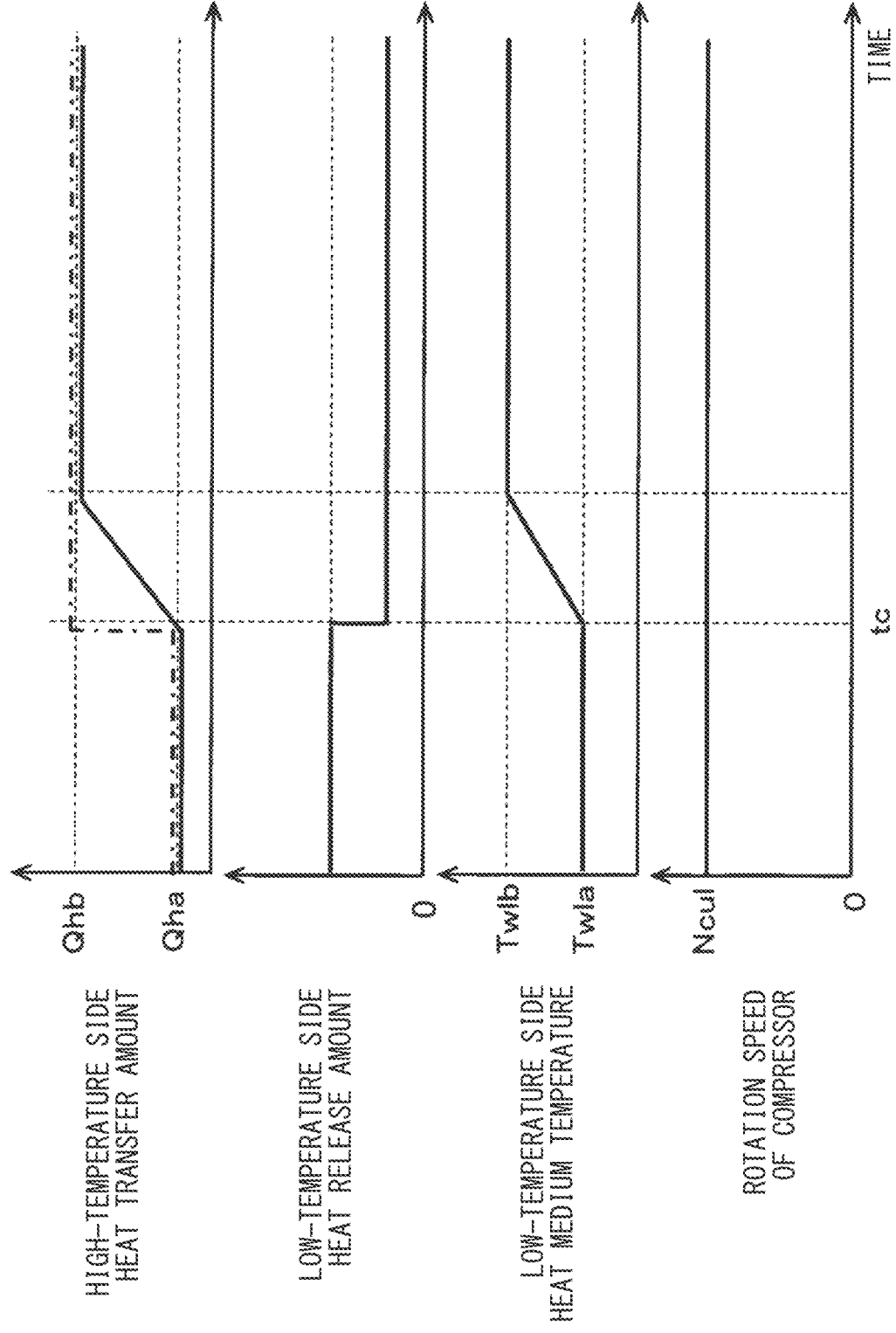
FIG. 9 is a diagram showing an example of an operation state when a heating request is changed.
Figure 10:
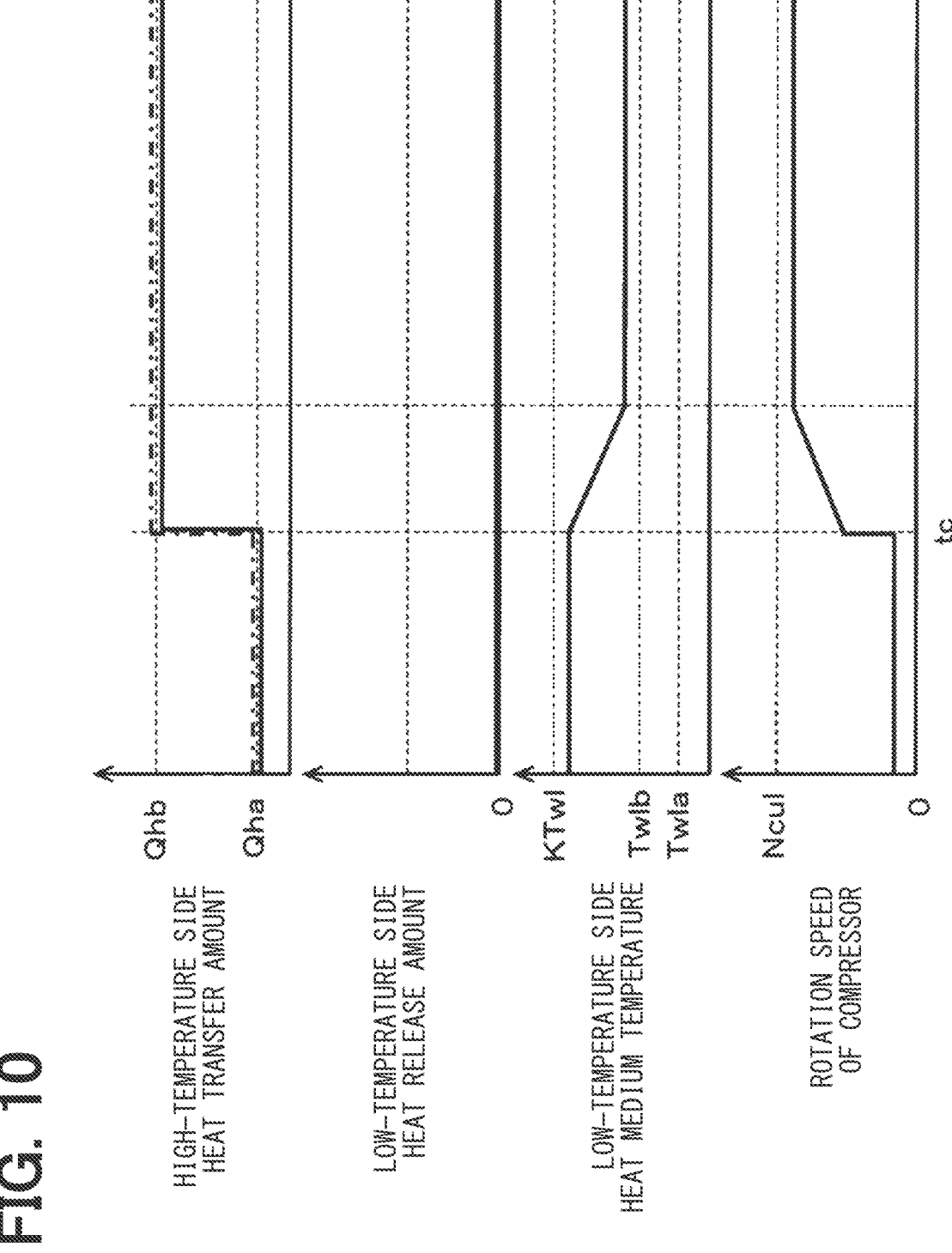
FIG. 10 is a diagram showing an example of a heating operation by the heat pump system according to the first embodiment.

Next, effects of the heat amount adjustment program according to the first embodiment will be described with reference to FIGS. 9 and 10. FIG. 9 is a comparative example for clarifying the effect of the heat amount adjustment program, and shows an operation of the heat pump system 1 related to the heating operation when heat amount adjustment in the low-temperature side heat medium circuit 40 or the like is not performed.

In the example shown in FIG. 9, a basic configuration of the heat pump system 1 is similar as that of the above-described embodiment, and a control mode of each component device during the heating operation is different from that of the first embodiment. As a precondition for the heat pump cycle 10 in the heating operation shown in FIG. 9, it is assumed that the high-temperature side heat transfer amount Qh necessary for achieving the target blowing temperature TaO is Qha and the rotation speed of the compressor 11 operates at the rotation speed upper limit value Ncul.

As a precondition of the low-temperature side heat medium circuit 40, it is assumed that waste heat of the heat generation device 46 and the like is sufficient and a part of the heat of the low-temperature side heat medium is released to the outside air via the low-temperature side outside air heat exchanger 43. It is assumed that the low-temperature side heat medium temperature Twl is adjusted to the low-temperature side heat medium temperature Twla corresponding to the high-temperature side heat transfer amount Qha by releasing heat to the outside air OA.

In a state according to this precondition, since the heat of the low-temperature side heat medium circulating in the low-temperature side heat medium circuit 40 is capable of ensuring a sufficient heat amount with respect to a required value at the high-temperature side heat transfer amount Qha, the heating operation can be implemented at the target blowing temperature TaO at this time point.

A case where the vehicle interior set temperature Tset is set higher from the heating operation in a state according to the precondition will be considered. In FIGS. 9 and 10, a time when the vehicle interior set temperature Tset is set to be higher is indicated as a set temperature change time tc.

In FIG. 9, as indicated by an alternate long and short dash line, when the vehicle interior set temperature Tset is set to be higher at the set temperature change time tc, the target blowing temperature TaO is changed to be higher, and accordingly, the high-temperature side heat transfer amount Qh increases from Qha to Qhb. On the other hand, since the actual high-temperature side heat transfer amount Qh remains at Qha at the set temperature change time tc because the actual high-temperature side heat transfer amount Qh remains in a state according to the precondition.

With the change from the high-temperature side heat transfer amount Qha to the Qhb, the heat amount on the low-temperature side heat medium circuit 40 side becomes insufficient. Therefore, a heat release amount to the outside air OA in the low-temperature side outside air heat exchanger 43 is reduced to increase the low-temperature side heat medium temperature Twl from Twla. At this time, on the heat pump cycle 10, the compressor 11 is operated at the rotation speed upper limit value Ncul as in a case of the precondition. As shown in FIG. 9, the low-temperature side heat medium temperature Twl gradually increases from a time point when the heat release amount to the outside air OA is reduced, and reaches the low-temperature side heat medium temperature Twlb corresponding to the high-temperature side heat transfer amount Qhb after the setting change.

Thus, when an attempt is made to correspond to a change in the high-temperature side heat transfer amount Qh required with the setting change by a change in a heat amount in the low-temperature side heat medium circuit 40 (that is, the low-temperature side heat medium temperature Twl), a response delay of the low-temperature side heat medium temperature Twl occurs. Therefore, it is assumed that a desired heating capacity cannot be achieved from the set temperature change time tc until the request for the high-temperature side heat transfer amount Qh after the change is satisfied, and comfort in the vehicle cabin cannot be sufficiently enhanced.

Next, an operation of the heating operation when the heat amount adjustment program according to the first embodiment is applied will be described with reference to FIG. 10. In a case shown in FIG. 10, as in a case shown in FIG. 9, it is assumed that the high-temperature side heat transfer amount Qh is the high-temperature side heat transfer amount Qha before the set temperature change time tc, and is changed to the high-temperature side heat transfer amount Qhb by changing the vehicle interior set temperature Tset to be higher at the set temperature change time tc.

As described in steps S5 and S6 of the heat amount adjustment program in the first embodiment, when the low-temperature side heat medium temperature Twl is equal to or lower than the reference value KTwl, the low-temperature side heat storage control is executed. Therefore, until the reference value KTwl is reached as an upper limit value of the low-temperature side heat medium temperature Twl, waste heat of the heat generation device 46 and the battery is stored in the low-temperature side heat medium. That is, before the set temperature change time tc, the low-temperature side heat medium temperature Twl equal to or higher than the low-temperature side heat medium temperature Twla corresponding to the high-temperature side heat transfer amount Qha is kept.

By keeping the low-temperature side heat medium temperature Twl high, it is possible to keep the rotation speed Nc of the compressor 11 low, and it is possible to keep the rotation speed Nc in a state in which there is a margin with respect to the rotation speed upper limit value Ncul.

According to the heat amount adjustment program in the first embodiment, until the low-temperature side heat medium temperature Twl becomes equal to or less than the reference value KTwl, waste heat of the heat generation device 46 or the like can be stored in the low-temperature side heat medium. Therefore, the heat pump system 1 is capable of creating a state in which there is a margin with respect to the rotation speed upper limit value Ncul in relation to an operation state of the compressor 11.

Accordingly, even when the high-temperature side heat transfer amount Qh increases from Qha to Qhb with a change in the vehicle interior set temperature Tset at the set temperature change time tc, the high-temperature side heat transfer amount Qhb can be achieved by increasing the rotation speed Nc of the compressor 11. As a result, as shown in FIG. 10, the heat pump system 1 is capable of quickly changing the heating capacity in response to a change in the vehicle interior set temperature Tset.

As described above, the heat pump system 1 according to the first embodiment includes the heat pump cycle 10, the heating unit 30 including the high-temperature side heat medium circuit 31, the low-temperature side heat medium circuit 40, and the energy manager 70. The heat pump system 1 is capable of performing a heating operation in which the heat of the low-temperature side heat medium is pumped up by the heat pump cycle 10 and used to heat the ventilation air in the heating unit 30.

According to the heat pump system 1, the rotation speed control over the compressor 11 in step S9, the low-temperature side heat storage control in step S6, and the heat amount adjustment control in step S12 are executed so as to approach the high-temperature side heat transfer amount Qh determined as a target value related to heating of the ventilation air.

Accordingly, since a heat absorption amount from the low-temperature side heat medium, a heating amount with respect to the low-temperature side heat medium, and a heat release amount can be adjusted in response to a change in the high-temperature side heat transfer amount Qh or the like, in the heating unit 30, a required heating capability of the ventilation air can be ensured as the high-temperature side heat transfer amount Qh. According to the heat pump system 1, a heat capacity of the low-temperature side heat medium in the low-temperature side heat medium circuit 40 can be effectively utilized, and thus it is possible to appropriately cope with a variation in a heating capability required in the heating unit 30.

In step S5, when the low-temperature side heat medium temperature Twl is equal to or lower than the reference value KTwl, the low-temperature side heat storage control (step S6) is executed, and when the low-temperature side heat medium temperature Twl is higher than the reference value KTwl, the low-temperature side heat release control (step S7) is executed.

Therefore, waste heat of the heat generation device 46 and the like can be stored in the low-temperature side heat medium until the low-temperature side heat medium temperature Twl reaches the reference value KTwl determined as the upper limit value of the low-temperature side heat medium temperature Twl. Accordingly, the heat pump system 1 is capable of realizing a state in which the heat amount that can be used in the low-temperature side heat medium circuit 40 is stored, so that when the heating capability required for the heating operation is changed, it is possible to quickly respond by using heat of the low-temperature side heat medium circuit 40.

When the high-temperature side heat medium temperature Twh is equal to or lower than the target high-temperature side heat medium temperature Twoh in step S8, the rotation speed control over the compressor 11 in step S9 and the heat amount adjustment control in step S12 are executed. In step S9 and step S12, the rotation speed of the compressor 11 and the heat amount in the heat generation device 46 and the like are adjusted such that the high-temperature side heat medium temperature Twh approaches the target high-temperature side heat medium temperature Twoh, and as a result, the low-temperature side heat medium temperature Twl is adjusted.

As a result, according to the heat pump system 1, even in the heating unit 30 including the high-temperature side heat medium circuit 31, the heat stored in the low-temperature side heat medium circuit 40 can be effectively used, and it is possible to quickly and flexibly cope with a change in the heating capacity or the like.

In the heat pump system 1, the high-temperature side heat transfer amount Qh is determined based on an air conditioning load at the time of heating indicated by the target blowing temperature TaO or the like, and the target low-temperature side heat medium temperature Twol, which is the target value of the low-temperature side heat medium temperature Twl, is determined to approach the high-temperature side heat transfer amount Qh.

Accordingly, according to the heat pump system 1, relationships between the target blowing temperature TaO, the high-temperature side heat transfer amount Qh, and the target low-temperature side heat medium temperature Twol can be found, and a heat amount of the low-temperature side heat medium circuit 40 can be appropriately adjusted according to a required heating capacity.

As shown in FIG. 1, a low-temperature side outside air heat exchanger 43 is disposed in the low-temperature side heat medium circuit 40. In the low-temperature side outside air heat exchanger 43, heat of the low-temperature side heat medium can be released to the outside air OA.

Therefore, in the heat pump system 1, in the low-temperature side heat release control in step S7, the heat of the low-temperature side heat medium can be released to the outside air OA via the low-temperature side outside air heat exchanger 43. Accordingly, the heat pump system 1 is capable of appropriately managing the heat amount of the low-temperature side heat medium circuit 40 in the heating operation.

When the rotation speed upper limit value Ncul of the compressor 11 is set in step S3, the control table shown in FIG. 6 is referred to. In the control table, it is determined that the higher the traveling speed of the vehicle A is, the larger the rotation speed upper limit value Ncul of the compressor 11 is.

Therefore, by intervening in a noise and vibration generated with the traveling of the vehicle A, it is possible to reduce an influence of the noise and the vibration due to an increase in the rotation speed of the compressor 11, and to improve comfort in the vehicle cabin.

In step S4, when the target low-temperature side heat medium temperature Twol is set, the low-temperature side heat medium temperature Twl to be a target value is determined using the relationships shown in FIGS. 7 and 8, the high-temperature side heat transfer amount Qh, and the rotation speed upper limit value Ncul of the compressor 11.

That is, each rotation speed upper limit value Ncul of the compressor 11 is associated with the low-temperature side heat medium temperature Twl that is a target value for achieving the high-temperature side heat transfer amount Qh.

Therefore, when the rotation speed upper limit value Ncul of the compressor 11 changes due to a change in a traveling situation of the vehicle A or the like, the heat pump system 1 is capable of quickly responding to the change in the heating capacity, and smoothly implementing the heating operation using the heat of the low-temperature side heat medium circuit 40.

According to the heat pump system 1 in the first embodiment, the heat amount adjustment control in step S12 is executed when the heat amount is insufficient by the heat stored in the low-temperature side heat medium circuit 40 in a normal state and the refrigerant discharge capacity of the compressor 11 is used at a maximum limit. In the heat amount adjustment control, since an inefficient operation of the heat generation device 46 and the like is performed compared with a normal state, it is considered that there is room for improvement in energy efficiency related to the heating operation.

In this regard, as shown in FIG. 5, prior to the heat amount adjustment control, the low-temperature side heat storage control in step S6 and the rotation speed control over the compressor 11 in step S9 are executed, and control with high energy efficiency is prioritized. Therefore, according to the heat pump system 1, it is possible to implement control in consideration of energy efficiency in relation to the heating operation using the heat of the low-temperature side heat medium circuit 40.

Second Embodiment

Next, a second embodiment different from the above-described embodiment will be described with reference to FIG. 11. In the second embodiment, a use mode of a high-temperature side heater 36 disposed in a high-temperature side heat medium circuit 31 is different from that of the above-described embodiment. Other basic configurations and the like are the similar as those of the above-described embodiment, and therefore will not be described again.

In the first embodiment described above, during the heating operation, the heating operation is performed by pumping up the heat amount of the low-temperature side heat medium circuit 40 in the heat pump cycle 10 without using the high-temperature side heater 36. As the heat source in the low-temperature side heat medium circuit 40, heat generated by an input and output of the battery, heat generated by an operation of the heat generation device 46, and heat generated by the low-temperature side heater 45 are used.

In this respect, in the second embodiment, a heating operation using heat of the high-temperature side heater 36 in addition to the heating heat source used in the first embodiment is performed. Processing contents of the heat amount adjustment program related to the heating operation in this case will be described with reference to FIG. 11.

Figure 11:
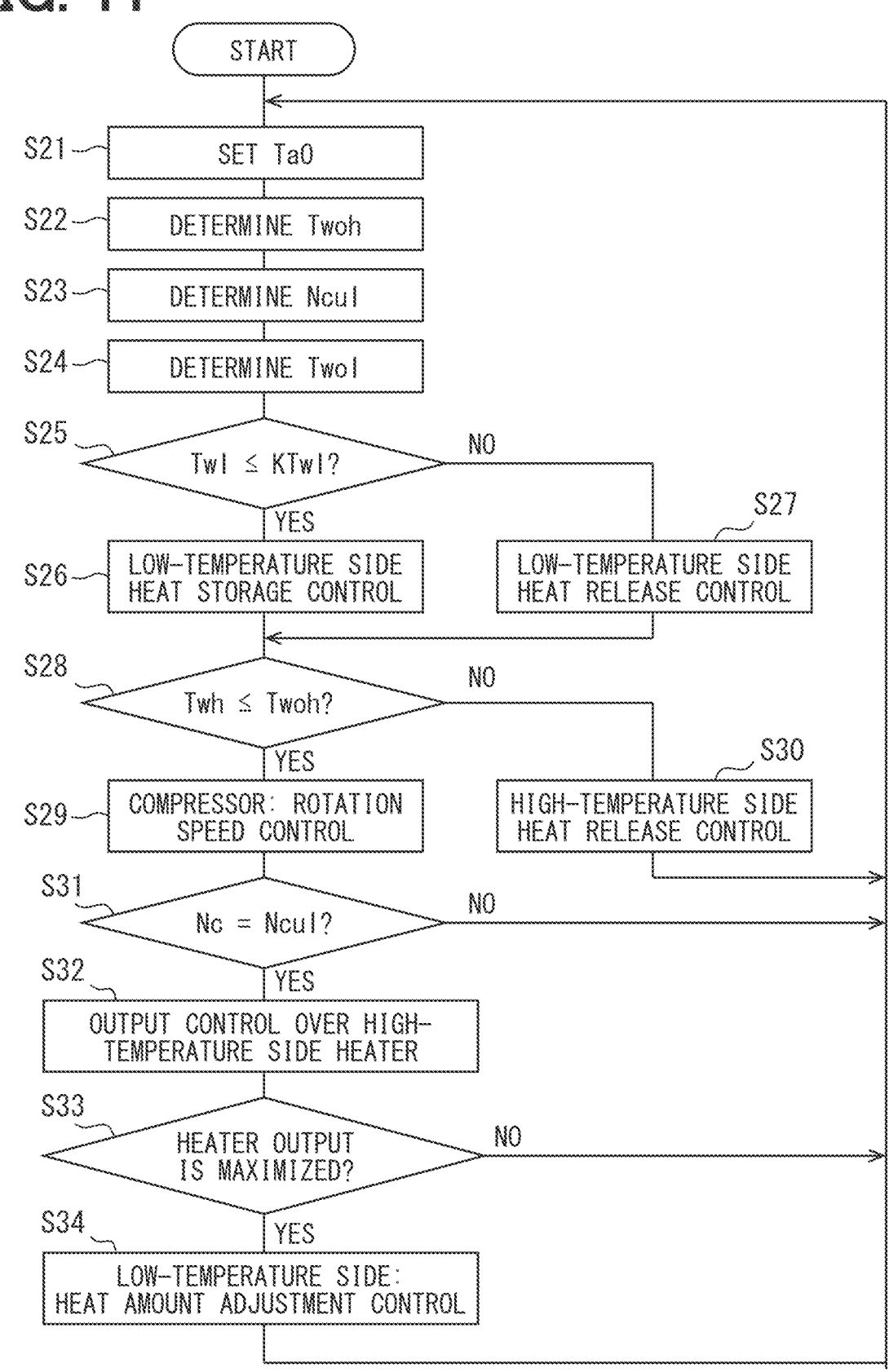
FIG. 11 is a flowchart related to a heat amount adjustment program during a heating operation according to a second embodiment.

As shown in FIG. 11, first, in step S21, a target blowing temperature TaO is set. The target blowing temperature TaO is calculated in a similar manner as in step S1 in the first embodiment according to an air conditioning load in a heating operation. In step S22, a target high-temperature side heat medium temperature Twoh is set. The target high-temperature side heat medium temperature Twoh is calculated by a similar method as in step S2.

When proceeding to step S23, a rotation speed upper limit value Ncul of a compressor 11 is set. Similarly to the first embodiment, the rotation speed upper limit value Ncul of the compressor 11 is set with reference to a traveling speed of a vehicle A and the control table shown in FIG. 6.

In step S24, a target low-temperature side heat medium temperature Twol is set. When the target low-temperature side heat medium temperature Twol is set, first, a high-temperature side heat transfer amount Qh is calculated as in the first embodiment.

The high-temperature side heat transfer amount Qh according to the second embodiment is calculated in consideration of a maximum heating capability of the high-temperature side heater 36 by using, for example, a current high-temperature side heat medium temperature Twh, a suction air temperature with respect to a heater core 33, a vehicle interior set temperature Tset, a blowing air volume supplied into a vehicle cabin, and the target blowing temperature TaO. In other words, the high-temperature side heat transfer amount Qh according to the second embodiment is obtained by subtracting the maximum heating capability of the high-temperature side heater 36 from a value corresponding to the high-temperature side heat transfer amount Qh in the first embodiment.

The target low-temperature side heat medium temperature Twol is determined by referring to the high-temperature side heat transfer amount Qh according to the second embodiment obtained in this manner, the rotation speed upper limit value Ncul of the compressor 11, and relationship diagrams shown in FIGS. 7 and 8. Accordingly, the target low-temperature side heat medium temperature Twol according to the second embodiment is a target value of a low-temperature side heat medium temperature Twl for achieving the high-temperature side heat transfer amount Qh in a state where the compressor 11 operates at the rotation speed upper limit value Ncul and the high-temperature side heater 36 exhibits the maximum heating capability.

In step S25, it is determined whether the low-temperature side heat medium temperature Twl is equal to or lower than a reference value KTwl. When the low-temperature side heat medium temperature Twl is equal to or lower than the reference value KTwl, low-temperature side heat storage control is executed in step S26. When the low-temperature side heat medium temperature Twl is higher than the reference value KTwl, low-temperature side heat release control is executed in step S27. Since processing contents of steps S25 to S27 are similar as those of steps S5 to S7 in the first embodiment, description thereof will not be repeated.

When proceeding to step S28, it is determined whether the high-temperature side heat medium temperature Twh is equal to or lower than the target high-temperature side heat medium temperature Twoh. When the high-temperature side heat medium temperature Twh is equal to or lower than the target high-temperature side heat medium temperature Twoh, rotation speed control over the compressor 11 is executed in step S29. When the high-temperature side heat medium temperature Twh is higher than the target high-temperature side heat medium temperature Twoh, high-temperature side heat release control is executed in step S30. Since processing contents of steps S28 to S30 are similar as those of steps S8 to S10 in the first embodiment, description thereof will not be repeated.

In step S31, in the rotation speed control over the compressor 11, it is determined whether a rotation speed Nc of the compressor 11 is the rotation speed upper limit value Ncul set in step S3. That is, in step S31, the same determination as in step S11 in the first embodiment is performed.

When the rotation speed Nc of the compressor 11 is the rotation speed upper limit value Ncul, in the second embodiment, the process proceeds to step S32, and output control over the high-temperature side heater 36 is executed. In the output control over the high-temperature side heater 36, a heat generation amount of the high-temperature side heater 36 is controlled such that the high-temperature side heat medium temperature Twh approaches the target high-temperature side heat medium temperature Twoh. On the other hand, when the rotation speed Nc of the compressor 11 is not the rotation speed upper limit value Ncul, the process returns to step S21.

In step S33, heat amount adjustment control in a low-temperature side heat medium circuit 40 is executed. Since processing contents of the heat amount adjustment control in step S33 are similar as that in step S12 in the first embodiment, description thereof will not be repeated. When the heat amount adjustment control in step S33 ends, the process returns to step S21.

According to a heat pump system 1 in the second embodiment, during a heating operation using heat of the low-temperature side heat medium circuit 40, waste heat in the low-temperature side heat medium circuit 40 and a refrigerant discharge capacity of the compressor 11 are used with priority as a heating heat source, in that order.

In a state where the waste heat in the low-temperature side heat medium circuit 40 is most used and the rotation speed Nc of the compressor 11 reaches the rotation speed upper limit value Ncul, a high-temperature side heat medium is heated by the high-temperature side heater 36 for the first time. When a heating capability of ventilation air is insufficient in the heating of the high-temperature side heater 36, the heat amount adjustment control in the low-temperature side heat medium circuit 40 is executed.

According to the heat pump system 1 in the second embodiment, by performing heating by the high-temperature side heater 36 in step S32 in preference to the heat amount adjustment control in step S34, it is possible to reduce a heat release loss due to piping or the like, and it is possible to efficiently achieve a desired heating capacity.

As described above, according to the heat pump system 1 in the second embodiment, even when the high-temperature side heater 36 is used as the heating heat source, it is possible to obtain an operation and effect obtained from a configuration and operation common to the above-described embodiment similarly to the above-described embodiment.

As shown in FIG. 11, the output control over the high-temperature side heater 36 is executed with a lower priority than the low-temperature side heat storage control and the rotation speed control over the compressor 11, and with a higher priority than the heat amount adjustment control over the low-temperature side heat medium circuit 40. Therefore, the heat pump system 1 is capable of utilizing heat generated in the high-temperature side heater 36 for the heating capacity while reducing an influence of the heat release loss due to the piping or the like, and is capable of improving energy efficiency of a heating operation using the heat of the low-temperature side heat medium circuit 40.

Third Embodiment

Next, a third embodiment different from the above-described embodiment will be described with reference to FIGS. 12 to 15. The third embodiment is different from the above-described embodiment in that temperature control over a low-temperature side heat medium circuit 40 is executed in accordance with a traveling state of a vehicle A.

Other basic configurations and the like are the similar as those of the above-described embodiment, and therefore will not be described again. Therefore, processing contents of a heat amount adjustment program are basically the same as those of the above-described embodiment.

Figure 12:
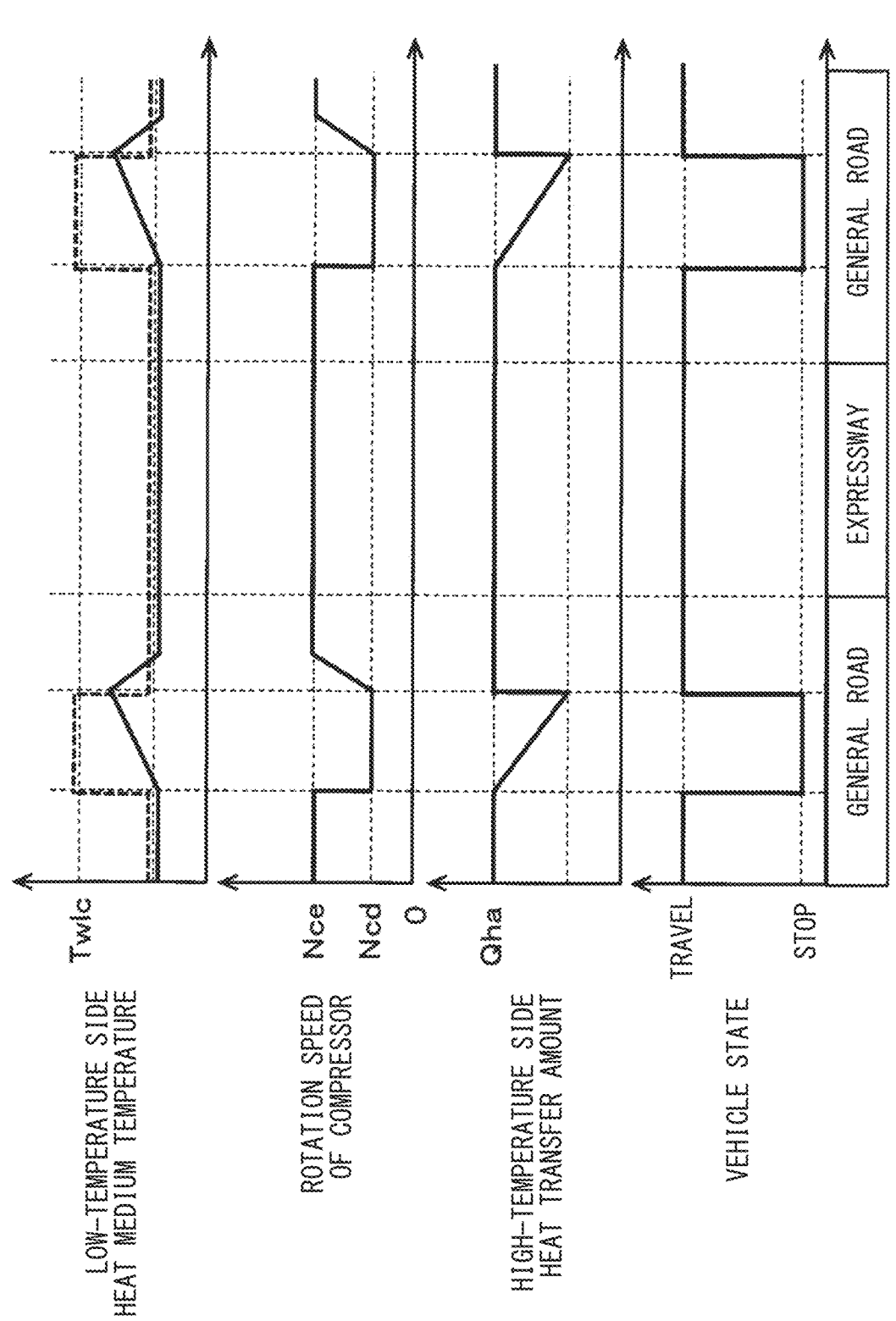
FIG. 12 is a diagram showing an example of an operation state when a target value of the heating operation is changed in accordance with a change in a traveling state of a vehicle.

Next, effects of the heat amount adjustment program in a heat pump system 1 according to the third embodiment will be described with reference to FIGS. 12 to 15. FIG. 12 is one comparative example for clarifying the effect of the heat amount adjustment program, and shows an operation of the heat pump system 1 when changing a target low-temperature side heat medium temperature Twol in accordance with a traveling state (traveling, stopping) of the vehicle A in a heating operation.

In the example shown in FIG. 12, a basic configuration of the heat pump system 1 is similar as that of the above-described embodiment, a control mode of each component device during the heating operation is different from that of the above-described embodiment, and the target low-temperature side heat medium temperature Twol is changed according to the traveling state of the vehicle A.

In the example shown in FIG. 12, it is assumed that the vehicle A travels on a general road, passes through an expressway, and then travels on a general road again. At this time, when the vehicle A is traveling, a predetermined low-temperature side heat medium temperature Twl is set as the target low-temperature side heat medium temperature Twol. On the other hand, when the vehicle A is stopped, a higher low-temperature side heat medium temperature Twlc is set as the target low-temperature side heat medium temperature Twol.

As described above, a rotation speed upper limit value Ncul of a compressor 11 is determined according to a traveling speed of the vehicle A. Therefore, when the vehicle A is in the traveling state, Nce that is the highest rotation speed upper limit value Ncul is set, and when vehicle A is in a stopped state, Ncd that is the low rotation speed upper limit value Ncul is set.

Therefore, in the example shown in FIG. 12, when the vehicle A is changed from the traveling state to the stopped state, the rotation speed upper limit value Ncul of the compressor 11 is switched to Ncd. At this time, the high-temperature side heat transfer amount Qh required in the heating operation related to the vehicle A is Qha, and in order to achieve the high-temperature side heat transfer amount Qha in a state where the rotation speed upper limit value Ncul of the compressor 11 is Ncd, the target low-temperature side heat medium temperature Twol needs to be Twlc.

If a higher target low-temperature side heat medium temperature Twol is not achieved under a condition that the rotation speed upper limit value Ncul of the compressor 11 is lower than that in the traveling state, the high-temperature side heat transfer amount Qh corresponding to the target blowing temperature TaO cannot be achieved.

Even when the vehicle A is in the stopped state, the low-temperature side heat medium temperature Twl gradually increases by recovering waste heat of a heat generation device 46 and the like. However, since the vehicle is in the stopped state, the temperature gradually approaches the target low-temperature side heat medium temperature Twol. That is, in the example shown in FIG. 12, a heating capacity decreases at a time point when the vehicle A is changed from the traveling state to the stopped state, and a time lag is required until, in the stopped state, the heating capacity is restored to the heating capacity that has been achieved. During this time lag, since the heating capacity in a vehicle cabin does not satisfy a request of an occupant, it is assumed that comfort in the vehicle cabin is impaired.

Next, another comparative example for clarifying the effect of the heat amount adjustment program will be described with reference to FIG. 13. The comparative example shown in FIG. 13 shows an operation of the heat pump system 1 in which the control is executed based on a state of the vehicle A in a stopped state during a heating operation and the target low-temperature side heat medium temperature Twol corresponding to the stopped state is used as a reference.

Figure 13:
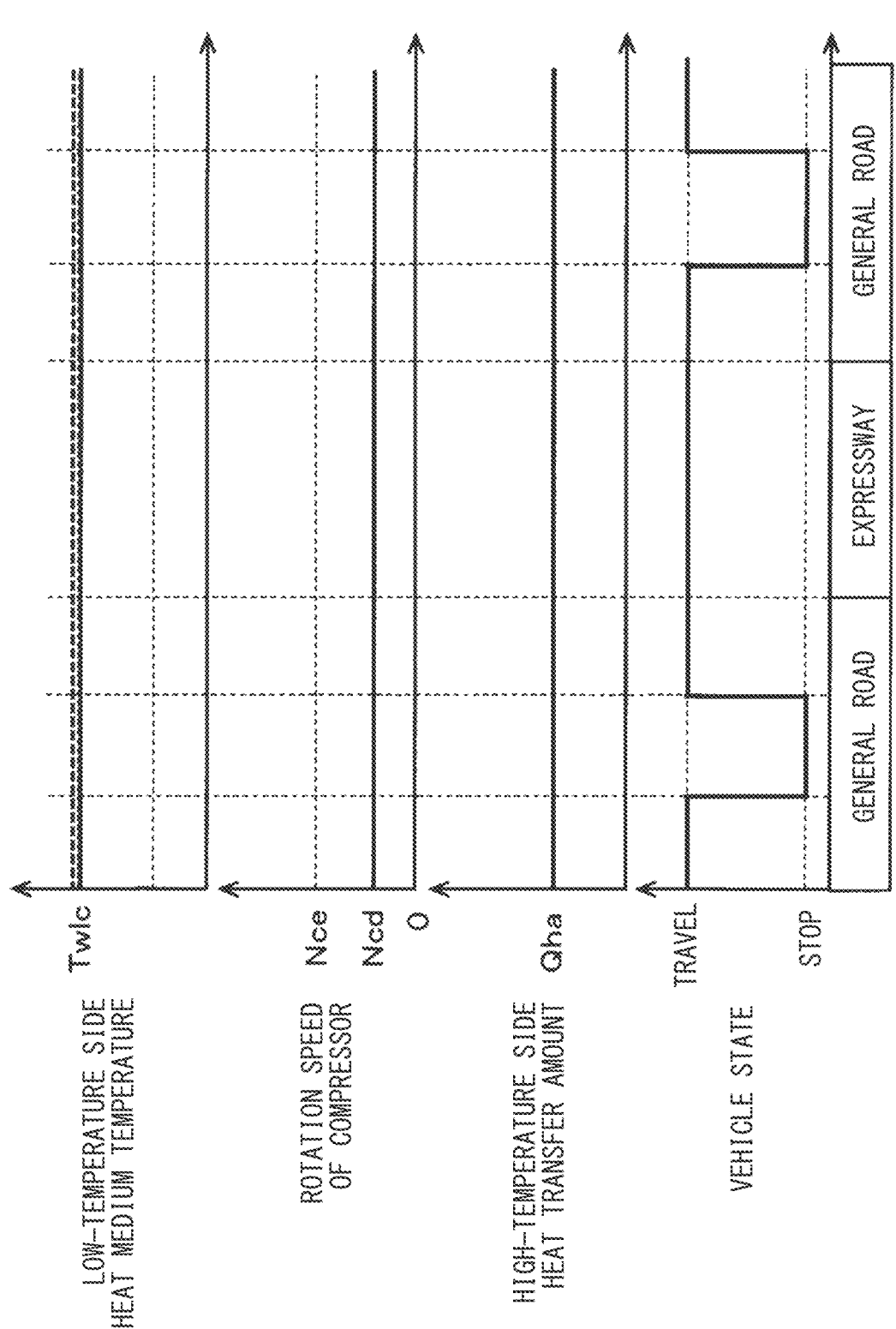
FIG. 13 is a diagram showing an example of an operation state when the target value of the heating operation is determined based on a stopped state of the vehicle.

In the example shown in FIG. 13, an operation of each component device of the heat pump system 1 is controlled so that the stopped state of the vehicle A is a reference. Therefore, the rotation speed upper limit value Ncul of the compressor 11 is determined to be Ncd based on the stopped state, and the target low-temperature side heat medium temperature Twol is determined to be Twlc determined on an assumption that the stopped state. The high-temperature side heat transfer amount Qh is also determined based on a state where the vehicle A is stopped.

In this case, as shown in FIG. 13, regardless of whether the vehicle A is traveling on a general road or the vehicle A is traveling on an expressway, the heating operation using the heat of the low-temperature side heat medium circuit 40 is performed on the assumption that the vehicle A is stopped.

When the vehicle A is traveling on a general road or an expressway, waste heat is generated by a battery or the heat generation device 46. However, when control is executed based on the stopped state, there is a possibility that heating is performed by a low-temperature side heater 45 in order to achieve the target low-temperature side heat medium temperature Twol. That is, as shown in FIG. 13, when the control is executed based on the stopped state, there is a possibility that the low-temperature side heater 45 having a low priority is used, and it is assumed that energy efficiency related to the heating operation decreases.

Next, effects of the heat amount adjustment program in the heat pump system 1 according to the third embodiment will be described with reference to FIG. 14. In the third embodiment as well, as in the above-described embodiments, the target blowing temperature TaO is set, a target high-temperature side heat medium temperature Twoh is determined, the rotation speed upper limit value Ncul of the compressor 11 is determined, and the target low-temperature side heat medium temperature Twol is determined.

In the third embodiment, the target blowing temperature TaO, the target high-temperature side heat medium temperature Twoh, the rotation speed upper limit value Ncul of the compressor 11, and the target low-temperature side heat medium temperature Twol are determined in view of not only a current state of the vehicle A but also a future situation of the vehicle A.

Specifically, the future situation of the vehicle A is estimated as a traveling state of the vehicle A after a predetermined time using information (for example, weather information or road traffic information) acquired from a cloud server 100 via a communication module 90 or navigation information on a navigation device 91. When an operation plan such as a time period of traveling or rest or a travel path to a destination is defined in the navigation device 91, the future situation of the vehicle A may be specified with reference to information on the operation plan.

In the third embodiment, the rotation speed upper limit value Ncul of the compressor 11 is basically different between a traveling speed range when the vehicle A is traveling on an expressway and a traveling speed range when the vehicle A travels on a general road or stops. Specifically, in a traveling speed range when the vehicle A travels on the expressway, Nce is set to the rotation speed upper limit value Ncul of the compressor 11. In the traveling speed range when the vehicle A travels on the general road or stopped, Ncd is set as the rotation speed upper limit value Ncul of the compressor 11.

First, when the vehicle is stopped for a predetermined time on a road on which the vehicle is traveling on a general road, in the heat pump system 1, an operation of each component device is controlled such that the low-temperature side heat medium temperature Twl approaches the target low-temperature side heat medium temperature Twol determined to achieve the high-temperature side heat transfer amount Qh.

At this time, the rotation speed upper limit value Ncul of the compressor 11 is set to Ncd, and does not change even when the vehicle is stopped. The high-temperature side heat transfer amount Qh is not changed between a case where the vehicle is traveling on the general road and a case where the vehicle is in a stopped state, and indicates the high-temperature side heat transfer amount Qha. Therefore, in the third embodiment, the target low-temperature side heat medium temperature Twol does not change from Twlc when the vehicle is traveling on a general road and when the vehicle is stopped. Therefore, according to the heat pump system 1 in the third embodiment, a response of the low-temperature side heat medium temperature Twl in the stopped state is not delayed, and a desired heating capacity can be ensured.

Figure 14:
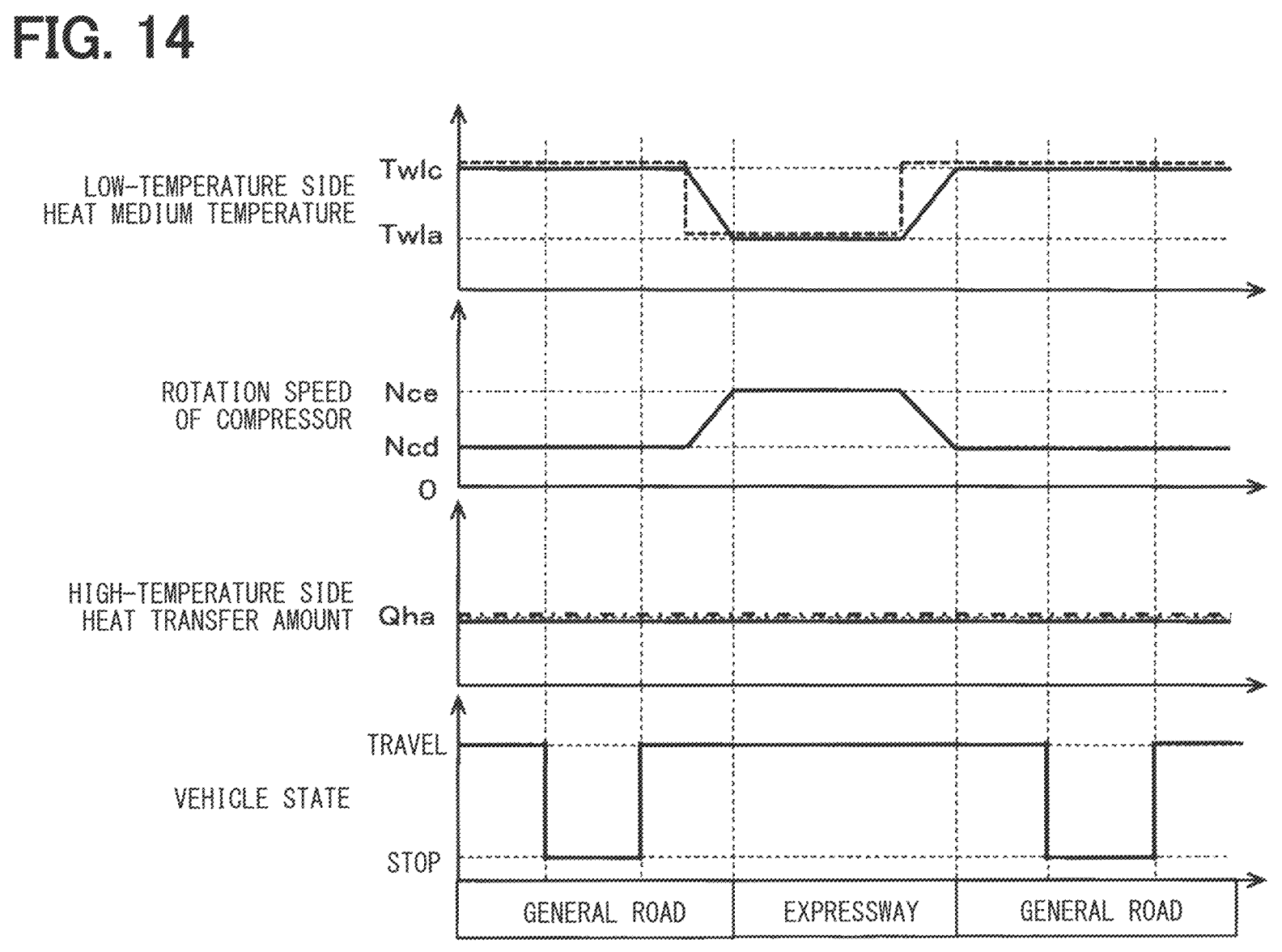

In an example shown in FIG. 14, by referring to the road traffic information, the navigation information, and the like, it is possible to specify a timing in the future when the vehicle A enters an expressway from a general road and a timing when the vehicle A descends from an expressway and travels on a general road. In a case of traveling on a general road, it is assumed that traveling and stopping occur irregularly depending on a traffic environment or a traffic signal. On the other hand, when the vehicle A travels on an expressway, it is considered to continue for a period in which a traveling speed of the vehicle A is high. Since a traveling speed range of the vehicle A, a frequency of traveling and stopping, and the like affect the rotation speed upper limit value Ncul of the compressor 11 and an amount of waste heat in the low-temperature side heat medium circuit 40, it is desirable to appropriately use different settings in consideration of energy efficiency of a heating operation.

In the heat pump system 1 according to the third embodiment, an operation of each component device is controlled according to a future change in a traveling environment of the vehicle A. Specifically, first, a timing at which the vehicle A will enter an expressway from a general road in the future is specified with reference to the road traffic information and the like. When traveling on an expressway, it is estimated that the vehicle continues to travel at high speed for a certain period of time, so that the rotation speed upper limit value Ncul of the compressor 11, the target low-temperature side heat medium temperature Twol, and the like are changed in advance to a mode corresponding to traveling on an expressway. A time for advance preparation prior to a change in the traveling environment or the like is referred to as an advance preparation time tap.

In the example shown in FIG. 14, in the advance preparation time tap, the rotation speed upper limit value Ncul of the compressor 11 is gradually increased from Ncd to Nce. At the same time, the target low-temperature side heat medium temperature Twol is lowered from Twlc corresponding to the general road to Twla. Accordingly, at a time point when the vehicle A enters the expressway, the rotation speed upper limit value Ncul of the compressor 11 and the low-temperature side heat medium temperature Twl are suitable for traveling on the expressway, so that the energy efficiency can be improved in relation to the heating operation when the vehicle travels on an expressway.

The vehicle A will descend from the expressway and travels on a general road in the future. Since a traveling speed range when traveling on a general road is lower than a traveling speed range when traveling on an expressway, it is assumed that the heat amount that can be used as a heating heat source in the low-temperature side heat medium circuit 40 is reduced. When traveling on a general road, unlike when traveling on an expressway, traveling and stopping occur irregularly, which is considered that the heating capacity is greatly affected.

Therefore, when the vehicle gets off the expressway to a general road, the rotation speed upper limit value Ncul of the compressor 11, the target low-temperature side heat medium temperature Twol, and the like are changed in advance to a mode corresponding to traveling on the general road. In the advance preparation time tap in this case, the rotation speed upper limit value Ncul of the compressor 11 is gradually lowered from Nce to Ncd. At the same time, the target low-temperature side heat medium temperature Twol is increased from Twla corresponding to the expressway to Twlc.

Accordingly, at a time point when the vehicle A gets off the expressway to a general road, the rotation speed upper limit value Ncul of the compressor 11 or the low-temperature side heat medium temperature Twl suitable for traveling on the general road is reached. Accordingly, the heat pump system 1 is capable of ensuring the required heating capacity at the same time as improvement of the energy efficiency in relation to the heating operation when traveling on a general road accompanied by irregular traveling and stopping.

A method of specifying the advance preparation time tap in the third embodiment will be described with reference to FIG. 15. First, as an example of calculating the advance preparation time tap, a case where the vehicle A is traveling on a general road at a current time point and enters an expressway in the future and a case where the vehicle A is traveling on an expressway at a current time point and gets off to a general road in the future will be described.

Figure 15:
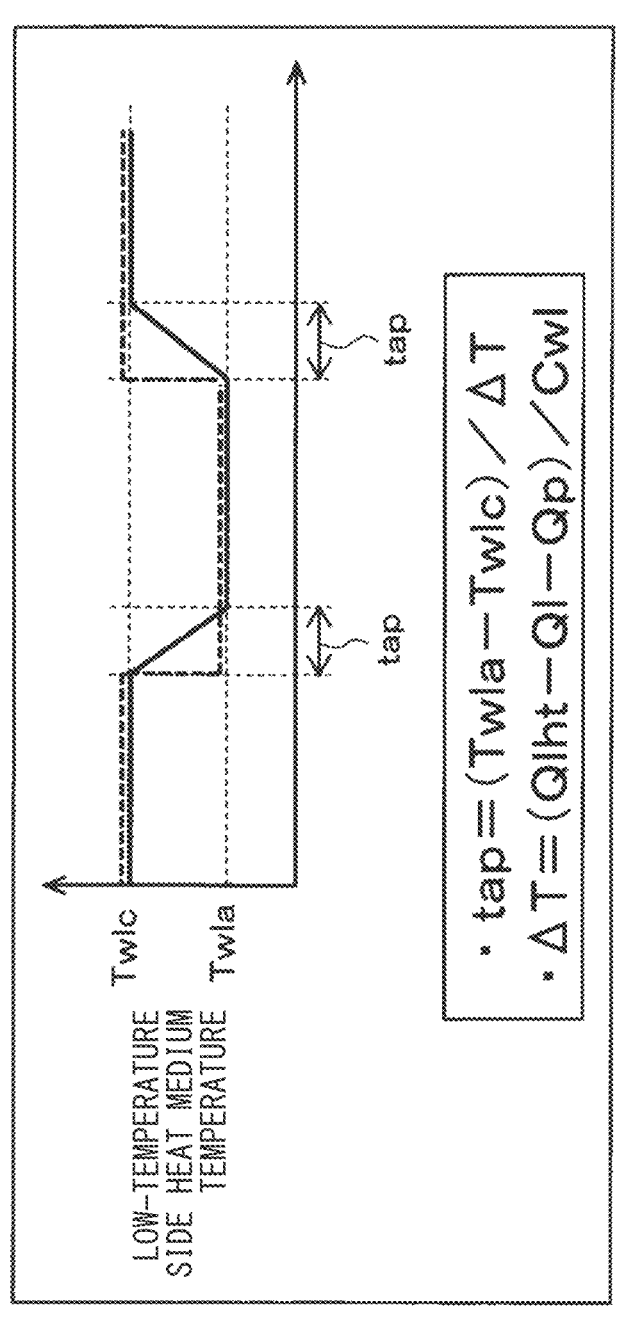
FIG. 15 is a diagram related to calculation of an advance preparation time in the third embodiment.

As shown in FIG. 15, the advance preparation time tap is calculated by dividing a temperature difference between the low-temperature side heat medium temperature Twl before the advance preparation time tap and the low-temperature side heat medium temperature after the advance preparation time tap by a temperature change rate ΔT.

Accordingly, when entering the expressway in the future, the advance preparation time tap is calculated by subtracting the low-temperature side heat medium temperature Twlc after the advance preparation time tap from the low-temperature side heat medium temperature Twla before the advance preparation time tap, and dividing the value by the temperature change rate ΔT. On the other hand, when getting off to a general road in the future, the advance preparation time tap is calculated by subtracting the low-temperature side heat medium temperature Twla after the advance preparation time tap from the low-temperature side heat medium temperature Twlc before the advance preparation time tap, and dividing the value by the temperature change rate ΔT.

The temperature change rate ΔT is a change rate per unit time of the low-temperature side heat medium temperature Twl in the advance preparation time tap. The temperature change rate $\Delta T$ is calculated by subtracting a low-temperature side heat transfer amount Ql and a piping heat release amount Qp from a low-temperature side heater heat generation amount Qlht, and dividing the value by a low-temperature side circuit heat capacity Cwl.

The low-temperature side heater heat generation amount Qlht means a heat generation amount of the low-temperature side heater 45 when a temperature of a low-temperature side heat medium is adjusted. When the low-temperature side heat medium temperature Twl is increased, the low-temperature side heater heat generation amount Qlht is determined by a maximum heat generation capacity of the low-temperature side heater 45. On the other hand, when the low-temperature side heat medium temperature Twl is decreased, the low-temperature side heater heat generation amount Qlht indicates 0. The low-temperature side heat transfer amount Ql is a heat amount heat-transferred from the low-temperature side heat medium to a low-pressure refrigerant by the chiller 16 during the heating operation. The piping heat release amount Qp is a heat release amount from the low-temperature side heat medium in the pipe of the low-temperature side heat medium circuit 40.

Thus, according to the heat pump system 1 in the third embodiment, it is possible to specify a time at which the traveling environment changes, such as a time when entering an expressway or gets off to a general road, using information acquired by the communication module 90 or the like.

As shown in FIG. 15, by specifying the advance preparation time tap, the heat pump system 1 is capable of adjusting a heat amount on a low-temperature side heat medium circuit 40 side in advance so that sufficient heating capacity can be exhibited at a time when the traveling environment changes. Accordingly, according to the heat pump system 1 in the third embodiment, it is possible to implement the heating operation flexibly and appropriately corresponding to a change in the traveling environment, and it is possible to keep a high level of comfort in the vehicle cabin.

As described above, according to the heat pump system 1 in the third embodiment, even when the heat amount of the low-temperature side heat medium circuit 40 is adjusted in consideration of a future change in the traveling environment, it is possible to similarly obtain an operation and effect obtained by a configuration and operation common to the above-described embodiment.

According to the heat pump system 1 in the third embodiment, it is possible to estimate a future traveling situation of the vehicle A using information acquired by the communication module 90 or the like, and to adjust a heat amount stored in the low-temperature side heat medium circuit 40 according to a change in the traveling situation. Accordingly, as shown in FIG. 14, the heat pump system 1 is capable adjusting a heating capacity in accordance with a change in the future traveling situation, and is capable maintaining the comfort in the vehicle cabin while reducing an influence of a change in the traveling situation.

When the target low-temperature side heat medium temperature Twol is changed based on a change in a future traveling situation, the advance preparation time tap is determined using the temperature change rate $\Delta T$ of the low-temperature side heat medium calculated using the low-temperature side heater heat generation amount Qlht and the low-temperature side heat medium temperature Twl at a current time point. Accordingly, the heat pump system 1 is capable of creating a state adjusted to an appropriate low-temperature side heat medium temperature Twl at a timing when a future traveling situation changes, is capable of reducing a change in the heating capacity due to the change in the traveling situation, and is capable of maintaining comfort in the vehicle cabin.

Fourth Embodiment

Next, a fourth embodiment different from the above-described embodiment will be described with reference to FIGS. 16 to 18. The fourth embodiment is different from the above-described embodiment in adjustment of a heat amount on a low-temperature side heat medium temperature Twl when there is a possibility that heating of a vehicle cabin is required. Other basic configurations and the like are the similar as those of the above-described embodiment, and therefore will not be described again.

A heat pump system 1 according to the fourth embodiment is provided with a heating prediction function for predicting whether there is a possibility that a heating operation is requested by a user. In the fourth embodiment, a prediction function setting program for performing setting related to enabling and disabling of a prediction function is executed.

First, processing contents of the prediction function setting program will be described with reference to FIG. 16. The prediction function setting program is stored in a storage unit of an energy manager 70, and is read and executed by a temperature adjustment control unit 71 constituting a processing unit.

Figure 16:
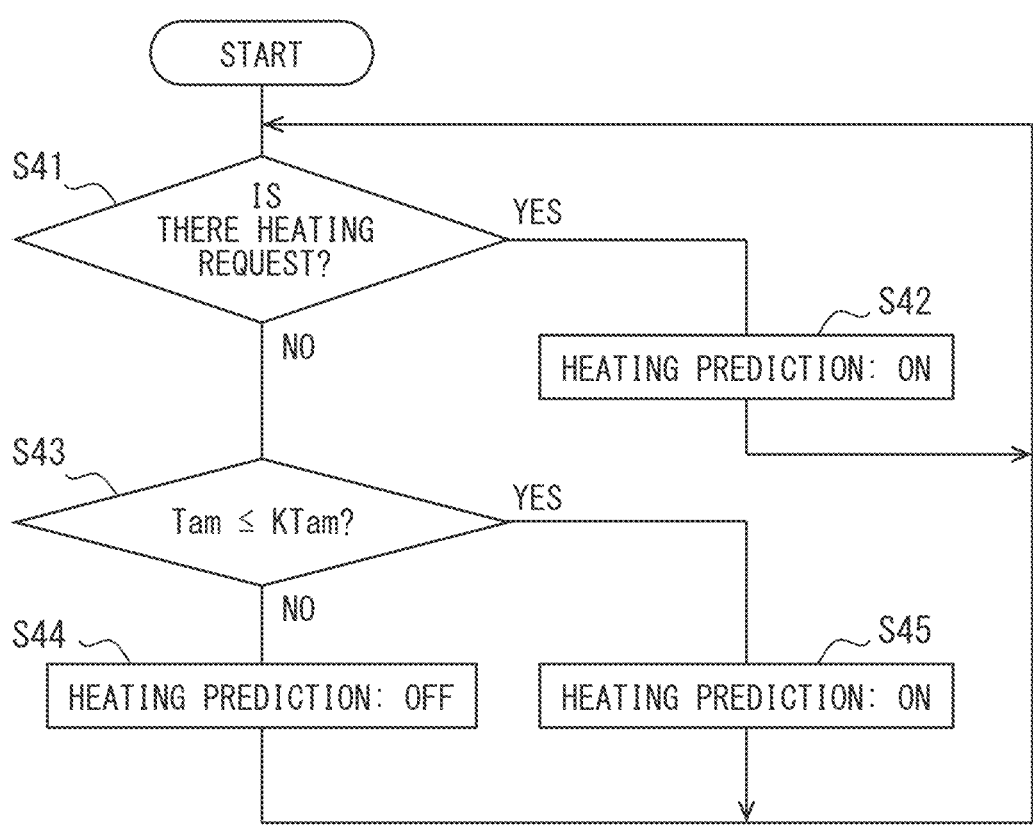
FIG. 16 is a flowchart related to a prediction function setting program in a fourth embodiment.

As shown in FIG. 16, first, in step S41, it is determined whether a heating request is on. The heating request indicates that a heating operation in the vehicle cabin is requested. In step S41, it is determined whether the heating request is on based on whether the user performs a heating request operation using a user input unit 92.

When the heating request is on, the heating operation is performed, and therefore, in step S42, the heating prediction function is set to on and then the heating operation is started. After the heating operation is started, the process returns to step S41. On the other hand, when the heating request is not on, the process proceeds to step S43.

In step S43, it is determined whether an outside air temperature Tam is equal to or lower than a predicted determination value KTam. The outside air temperature Tam is a temperature of air outside the vehicle cabin in a vehicle A, and is specified using a detected value of an outside air temperature sensor in a control sensor group. The predicted determination value KTam is a parameter indicating a situation in which a heating operation is likely to be performed, and the outside air temperature is used, and can be set to a value such as 0 degrees, for example.

When the outside air temperature Tam is higher than the predicted determination value KTam, it is considered that the outside air temperature Tam is high and a possibility that a heating operation is required is low, so that the heating prediction function is set to off in step S44. On the other hand, when the outside air temperature Tam is equal to or lower than the predicted determination value KTam, it is considered that an environment is one in which the outside air temperature Tam is low and a necessity of a heating operation is high, so that the heating prediction function is set to on in step S45. After the heating prediction function is set in step S44 and step S45, the process returns to step S41.

Next, effects of the heat amount adjustment program in the heat pump system 1 according to the fourth embodiment will be described with reference to FIGS. 17 and 18. FIG. 17 is a comparative example for clarifying an effect of the heat amount adjustment program, and shows an operation of the heat pump system 1 when a heating operation is executed in a situation where the heating prediction function is on.

Figure 17:
FIG. 17 is a diagram showing an example of an operation state when a heating operation is started from a heating stop state.

In the example shown in FIG. 17, a basic configuration of the heat pump system 1 is similar to that of the above-described embodiment, and it is assumed that the vehicle A is traveling and the heating operation is in an operation stop state. From the operation stop state of the heat pump system 1, a heating request is made via the user input unit 92 at a heating request effective time td, and the heating operation is started.

In this case, since the heat pump system 1 is in the operation stop state, a rotation speed Nc of a compressor 11 is 0, and a high-temperature side heat transfer amount Qh is also 0. Since the vehicle A is in a traveling state, the low-temperature side heat medium temperature Twl indicates a temperature corresponding to waste heat due to waste heat from a heat generation device 46 and a battery. At this time, since it is not necessary to use heat of a low-temperature side heat medium as a heating heat source or the like, the heat is released to an outside air OA in a low-temperature side outside air heat exchanger 43. Therefore, a low-temperature side heat release amount indicates a value corresponding to waste heat of the battery or the like.

In this situation, when the heating operation is started based on the heating request made at the heating request effective time td, the rotation speed upper limit value Ncul of the compressor 11 becomes effective with the start of the heating operation. Accordingly, as indicated by an alternate long and short dash line in FIG. 17, the high-temperature side heat transfer amount Qh is set to a high-temperature side heat transfer amount Qha determined based on a target blowing temperature TaO.

A target low-temperature side heat medium temperature Twol is set to a low-temperature side heat medium temperature Twla corresponding to the high-temperature side heat transfer amount Qha. In this case, it is necessary to raise the low-temperature side heat medium temperature Twl to Twla that is the target low-temperature side heat medium temperature Twol, and in order to effectively use waste heat of the battery or the like, an operation of a component device (for example, a shutter device 47) is controlled so that the low-temperature side heat release amount becomes 0.

Based on the heating request at the heating request effective time td, a target value of the high-temperature side heat transfer amount Qh is changed to the high-temperature side heat transfer amount Qha. However, the low-temperature side heat medium temperature Twl gradually increases toward Twla, which is target low-temperature side heat medium temperature Twol. Therefore, an actual measurement value of the high-temperature side heat transfer amount Qh gradually increases toward the high-temperature side heat transfer amount Qha as the low-temperature side heat medium temperature Twl increases.

Thus, when the heating operation is started from the operation stop state, when an attempt is made to correspond to a change in the required high-temperature side heat transfer amount Qh by a change in a heat amount in a low-temperature side heat medium circuit 40 (that is, the low-temperature side heat medium temperature Twl), a response delay of the low-temperature side heat medium temperature Twl occurs. Therefore, it is assumed that a desired heating capacity cannot be achieved from the heating request effective time td until a request for the high-temperature side heat transfer amount Qh after the change is satisfied, and comfort in the vehicle cabin cannot be sufficiently enhanced.

Next, an operation of a heating operation when the heat amount adjustment program is applied in the heat pump system 1 according to the fourth embodiment will be described with reference to FIG. 18. In a case shown in FIG. 18, first, it is assumed that a heating prediction function is set to on by the above-described prediction function setting program. That is, an initial stage in FIG. 18 corresponds to a heating prediction effective time tp.

In the fourth embodiment as well, when the low-temperature side heat medium temperature Twl is equal to or lower than a reference value KTwl, low-temperature side heat storage control is executed. Therefore, until the reference value KTwl is reached as an upper limit value of the low-temperature side heat medium temperature Twl, waste heat of the heat generation device 46 and the battery is stored in the low-temperature side heat medium. That is, even before the heating request effective time td, it is possible to create a state showing the low-temperature side heat medium temperature Twl equal to or higher than the low-temperature side heat medium temperature Twla corresponding to the high-temperature side heat transfer amount Qha.

Figure 18:
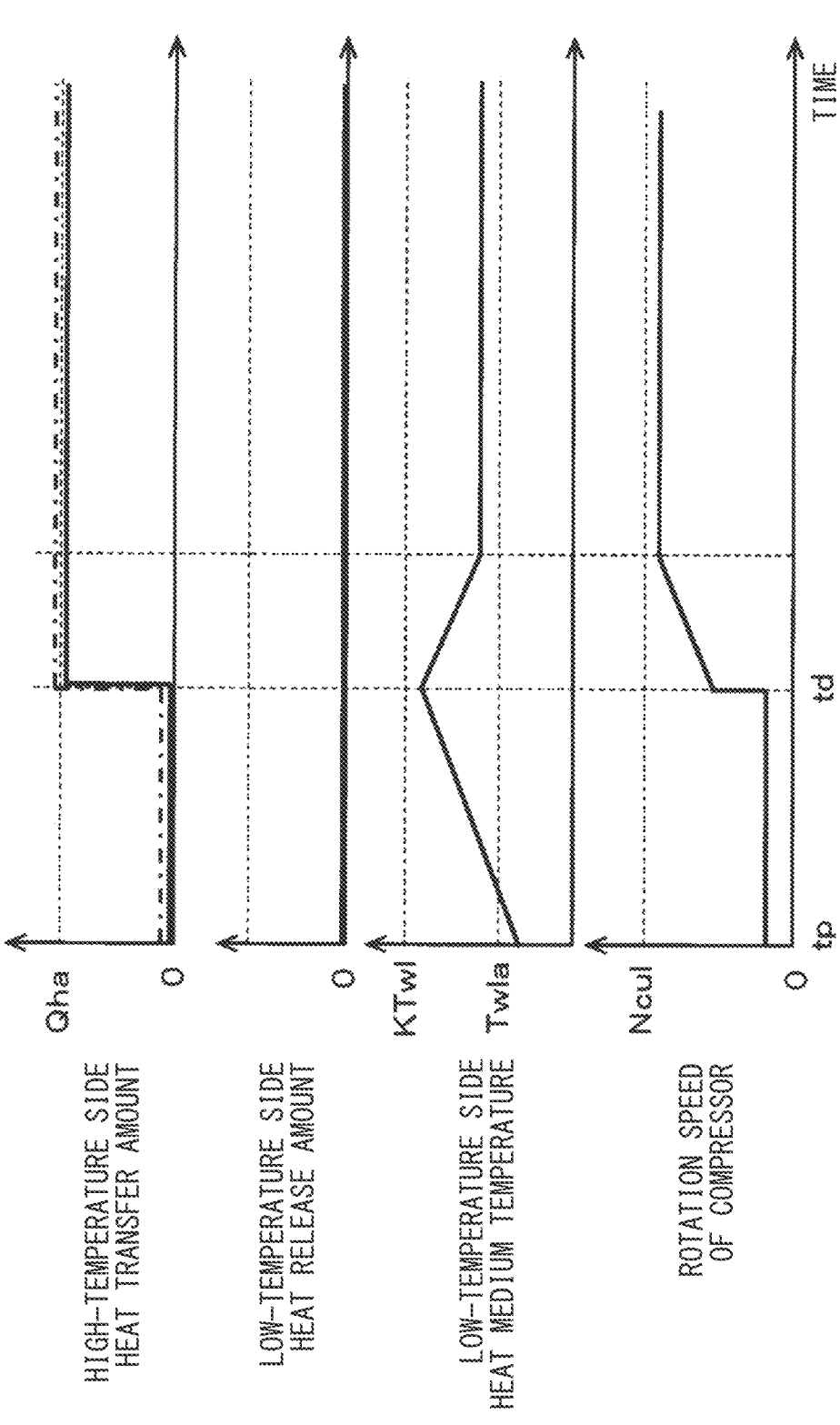
FIG. 18 is a diagram showing an example of a heating operation by a heat pump system according to the fourth embodiment.

When the heating operation based on the heating request effective time td is started in this state, as shown in FIG. 18, by immediately increasing the rotation speed Nc of the compressor 11, it is possible to pump up heat of the low-temperature side heat medium, which is sufficiently ensured, and achieve the high-temperature side heat transfer amount Qha that has met the heating request. That is, as shown in FIG. 18, it is possible to prevent a response delay for the high-temperature side heat transfer amount Qh with respect to a change of a target value of the high-temperature side heat transfer amount Qh, and it is possible to quickly respond to the heating request.

According to the heat pump system 1 in the fourth embodiment, by adjusting the heat of the low-temperature side heat medium in advance when the heating prediction function is on, even when a heating operation is started from an operation stop state in response to a heating request, a heating capacity can be quickly ensured.

As described above, according to the heat pump system 1 in the fourth embodiment, even when the heat amount of the low-temperature side heat medium circuit 40 is adjusted in preparation for a future heating operation, it is possible to similarly obtain an operation and effect obtained by a configuration and operation common to the above-described embodiment.

According to the heat pump system 1 in the fourth embodiment, when it is determined that there is a higher possibility that the heating request is made based on the outside air temperature Tam or the like, it is possible to store heat in the low-temperature side heat medium circuit 40 from a time point before the heating request is made by the low-temperature side heat storage control. When the heating request is made, the heat pump system 1 is capable of pumping up the stored heat on a low-temperature side heat medium circuit 40 side by rotation speed control over the compressor 11, quickly achieving a desired heating capacity, and improving warm-up performance.

The present disclosure is not limited to the above-described embodiment, and various modifications can be made as follows without departing from the gist of the present disclosure.

In the heat pump system 1 according to the above-described embodiment, the high-temperature side heat medium circuit 31 having the heat medium-refrigerant heat exchanger 12 and the heater core 33 is adopted as the heating unit 30, but the invention is not limited to this aspect. As long as the heat pump cycle 10 is capable of pumping up heat on the low-temperature side heat medium circuit 40 side to heat the ventilation air, various modes can be adopted as the heating unit 30. For example, an interior condenser may be adopted instead of the heat medium-refrigerant heat exchanger 12. In this case, similarly to the heater core 33 in the above-described embodiment, the interior condenser is disposed inside the casing 61 and heats the ventilation air by heat of the high-pressure refrigerant.

A configuration of the low-temperature side heat medium circuit according to the present disclosure is not limited to the aspect described in the above-described embodiment. Various modes can be adopted as long as the low-temperature side heat medium circuit includes at least one component device corresponding to the heat source and at least one component device corresponding to the heat amount adjustment unit.

In the above-described embodiment, the heat generation device 46, the battery heat exchanging unit 42 including the battery, and the low-temperature side heater 45 are mounted as the heat source, but any one of the heat generation device 46, the battery heat exchanging unit 42, and the low-temperature side heater 45 may be used. The heat source may have any configuration as long as the heat source is capable of applying heat to the low-temperature side heat medium. Instead of the components such as the heat generation device 46, other components may be used.

In the above-described embodiment, the low temperature side pump 41, the outside air fan 43a, the low-temperature side flow rate adjustment valve 44, and the shutter device 47 are provided as the heat amount adjustment unit to adjust the heat release amount in the low-temperature side outside air heat exchanger 43, but the invention is not limited to this aspect. Other component devices may be adopted as long as the heat amount of the low-temperature side heat medium can be adjusted.

A disposition of the component devices in the low-temperature side heat medium circuit is not limited to the above-described embodiment. A connection mode of the heat medium pipe to the component device in the low-temperature side heat medium circuit is not limited to the mode described in the above-described embodiment. For example, in the above-described embodiment, the low-temperature side flow rate adjustment valve 44 branches into flow on a low-temperature side outside air heat exchanger 43 side and flow bypassing the low-temperature side outside air heat exchanger 43, but a configuration in which flows are connected without branching can be adopted.

In the high-temperature side heat medium circuit 31 in the above-described embodiment, the high-temperature side heater 36 is disposed as a component device, but the invention is not limited to this aspect. For example, when the heat amount adjustment program according to the first embodiment is executed, it is possible to adopt a mode in which the high-temperature side heater 36 is excluded from the component device of the high-temperature side heat medium circuit 31.

A disposition of the component devices in the high-temperature side heat medium circuit is not limited to the above-described embodiment. A connection mode of the heat medium pipe to the component device in the high-temperature side heat medium circuit is not limited to the mode described in the above-described embodiment. For example, in the above-described embodiment, the high-temperature side flow rate adjustment valve 35 branches into flow on a heater core 33 side and flow on a high-temperature side outside air heat exchanger 34 side, but a configuration in which the flows are connected without branching can be adopted.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A heat pump system comprising:
a heat pump cycle including
    a compressor configured to compress and discharge a refrigerant,
    a condenser configured to release heat of a high-pressure refrigerant compressed by the compressor and condense the high-pressure refrigerant,
    a valve configured to reduce a pressure of the refrigerant that has flowed out of the condenser, and
    an evaporator configured to cause the refrigerant whose pressure is reduced by the valve to absorb heat and evaporate;
a heating heat exchanger configured to heat ventilation air to be blown into a space to be air conditioned by using a heat source that is the heat released from the high-pressure refrigerant in the condenser;
a low-temperature side heat medium circuit configured to circulate a low-temperature side heat medium and cause the refrigerant in the evaporator to absorb heat of the low-temperature side heat medium, the low-temperature side heat medium circuit including
    a heat source device configured to heat the low-temperature side heat medium, and
    a heat amount adjustment unit configured to adjust an amount of heat carried by the low-temperature side heat medium; and
at least one processor and at least one memory storing a program, the program is configured to cause, when executed by the at least one processor, the at least one processor to carry out:
causing an amount of heat transfer in the heating heat exchanger for heating the ventilation air to approach a predetermined target value via adjustment in a temperature of the low-temperature side heat medium by controlling a rotation speed of the compressor and an operation of at least one of the heat source device and the heat amount adjustment unit, wherein
the heating heat exchanger is included in a high-temperature side heat medium circuit configured to circulate a high-temperature side heat medium and cause the high-pressure refrigerant in the condenser to release heat to the high-temperature side heat medium, the heating heat exchanger configured to heat the ventilation air via heat exchange with the high-temperature side heat medium, and
the processor is configured to cause a temperature of the high-temperature side heat medium to approach a target high-temperature side heat medium temperature via the adjustment in the temperature of the low-temperature side heat medium by controlling the rotation speed of the compressor and the operation of at least one of the heat source device and the heat amount adjustment unit, the target high-temperature side heat medium temperature being determined based on a target value of the amount of heat transfer in the heating heat exchanger.

2. The heat pump system according to claim 1, wherein the processor is configured to at least maintain the amount of heat carried by the low-temperature side heat medium until the temperature of the low-temperature side heat medium reaches a predetermined reference value when the ventilation air is heated by the heating heat exchanger.

3. The heat pump system according to claim 1, wherein the processor is configured to determine the target value of the amount of heat transfer according to a target blowing temperature of the ventilation air to be blown into a vehicle cabin, and determine a target low-temperature side heat medium temperature that is a target value of the temperature of the low-temperature side heat medium at which the amount of heat transfer in the heating heat exchanger approaches the target value of the amount of heat transfer.

4. The heat pump system according to claim 1, wherein the low-temperature side heat medium circuit includes a low-temperature side outside air heat exchanger configured to perform heat exchange between the low-temperature side heat medium and outside air, and the processor is configured to control an operation of the heat amount adjustment unit to adjust an amount of heat release from the low-temperature side heat medium to the outside air.

5. The heat pump system according to claim 1, wherein the processor is configured to determine at least two or more upper limit values of the rotation speed of the compressor, determine a target low-temperature side heat medium temperature for each of the two or more the rotation speed upper limit values of the compressor, the target low-temperature side heat medium temperature being a target value of the temperature of the low-temperature side heat medium required for the amount of heat transfer in the heating heat exchanger to achieve the target value of the amount of heat transfer, and cause the temperature of the low-temperature side heat medium to approach the target low-temperature side heat medium temperature by controlling the operation of the heat amount adjustment unit.

6. The heat pump system according to claim 1, wherein the heat pump system is mounted on a vehicle, and the processor is configured to determine a rotation speed upper limit value of the compressor according to a traveling speed of the vehicle.

7. A heat pump system comprising:

a heat pump cycle including a compressor configured to compress and discharge a refrigerant, a condenser configured to release heat of a high-pressure refrigerant compressed by the compressor and condense the high-pressure refrigerant, a valve configured to reduce a pressure of the refrigerant that has flowed out of the condenser, and an evaporator configured to cause the refrigerant whose pressure is reduced by the valve to absorb heat and evaporate;

a heating heat exchanger configured to heat ventilation air to be blown into a space to be air conditioned by using a heat source that is the heat released from the high-pressure refrigerant in the condenser;

a low-temperature side heat medium circuit configured to circulate a low-temperature side heat medium and cause the refrigerant in the evaporator to absorb heat of the low-temperature side heat medium, the low-temperature side heat medium circuit including a heat source device configured to heat the low-temperature side heat medium, and a heat amount adjustment unit configured to adjust an amount of heat carried by the low-temperature side heat medium; and at least one processor and at least one memory storing a program, the program is configured to cause, when executed by the at least one processor, the at least one processor to carry out:

causing an amount of heat transfer in the heating heat exchanger for heating the ventilation air to approach a predetermined target value via adjustment in a temperature of the low-temperature side heat medium by controlling a rotation speed of the compressor and an operation of at least one of the heat source device and the heat amount adjustment unit, wherein the heat pump system is mounted on a vehicle, the processor is configured to estimate a future traveling situation of the vehicle, and the processor is configured to change a target low-temperature side heat medium temperature, which is a target value of the temperature of the low-temperature side heat medium, based on the estimated future traveling situation of the vehicle.

8. The heat pump system according to claim 7, wherein the processor is configured to determine an advance preparation time based on a temperature change rate of the low-temperature side heat medium and the temperature of the low-temperature side heat medium at a current time point before changing the target low-temperature side heat medium temperature based on the future traveling situation of the vehicle estimated by the traveling situation estimation unit, the advance preparation time being a time at which the heat source is operated prior to a time of the changing in the target low-temperature side heat medium temperature, the temperature change rate of the low-temperature side heat medium being calculated based on a maximum heat generation capacity of the heat source device.

* * * * *